(12) United States Patent
Sambhwani et al.

(10) Patent No.: US 12,096,411 B2
(45) Date of Patent: Sep. 17, 2024

(54) SYSTEMS AND METHODS FOR EARLY FR2 TUNE-AWAY

(71) Applicant: Apple Inc., Cupertino, CA (US)

(72) Inventors: Sharad Sambhwani, San Diego, CA (US); Dirk Nickisch, Oberpframmern (DE); Madhukar Krishnamoorthi Shanbhag, Santa Clara, CA (US); Sanjeevi Balasubramanian, San Jose, CA (US); Shiva Krishna Narra, San Jose, CA (US); Sriram Subramanian, Santa Clara, CA (US); Vishwanth Kamala Govindaraju, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 203 days.

(21) Appl. No.: 17/517,468

(22) Filed: Nov. 2, 2021

(65) Prior Publication Data

US 2023/0010533 A1    Jan. 12, 2023

Related U.S. Application Data

(60) Provisional application No. 63/220,111, filed on Jul. 9, 2021.

(51) Int. Cl.
   *H04W 72/0453*    (2023.01)
(52) U.S. Cl.
   CPC ............................... *H04W 72/0453* (2013.01)
(58) Field of Classification Search
   None
   See application file for complete search history.

(56) References Cited

U.S. PATENT DOCUMENTS

| | | | |
|---|---|---|---|
| 6,609,003 B1* | 8/2003 | Park | H04W 36/18 |
| | | | 455/442 |
| 2013/0051263 A1* | 2/2013 | Watanabe | H04W 72/542 |
| | | | 370/252 |
| 2015/0195837 A1* | 7/2015 | Fuse | H04L 5/001 |
| | | | 370/329 |
| 2018/0227109 A1* | 8/2018 | Lee | H04L 5/0098 |
| 2021/0045044 A1* | 2/2021 | Tran | H04W 48/18 |
| 2021/0127256 A1* | 4/2021 | Li | H04W 60/005 |
| 2024/0023036 A1* | 1/2024 | Chen | H04B 17/254 |

FOREIGN PATENT DOCUMENTS

CN          112788790 A    *    5/2021    ............ H04W 76/15

* cited by examiner

*Primary Examiner* — The Hy Nguyen
(74) *Attorney, Agent, or Firm* — FLETCHER YODER PC

(57) ABSTRACT

This disclosure provide various techniques for decreasing the time it takes user equipment to tune away from a compromised network connection. By more quickly detecting a signal characteristic issue (e.g., signal quality issue) in the compromised signal and performing mitigation actions, the user equipment may decrease power consumption and increase data throughput. The signal quality issue may be detected by monitoring the location of the user equipment, a channel impulse response of the user equipment, and/or a block error rate (BLER) of a signal, among other methods. The data obtained may be fed into confidence validation logic, which may determine a level of confidence that the signal quality issue may cause a weak or broken connection between the user equipment and a network. The confidence validation logic may, based on the determination, operate the user equipment in an active state, a suspend state, or a release state.

20 Claims, 12 Drawing Sheets

SYSTEMS AND METHODS FOR EARLY FR2 TUNE-AWAY

CROSS-REFERENCE TO RELATED APPLICATION

This application claims the benefit of U.S. Provisional Application No. 63/220,111, filed Jul. 9, 2021, and entitled "SYSTEMS AND METHODS FOR EARLY FR2 TUNE-AWAY," which is hereby incorporated by reference in its entirety for all purposes.

BACKGROUND

The disclosure relates generally to wireless communication, and, more particularly, wireless communication over fifth generation (5G) New Radio (NR) Frequency Range 2 (FR2) frequencies (e.g., between 24 gigahertz (GHz) and 100 GHz). User equipment may establish communication with and transfer data using one or more links to one or more cellular networks. However, some cellular network links may experience greater signal degradation (e.g., degradation of signal characteristics such as signal quality, signal power, or both) than others as a result of "blurring" or "shadowing;" e.g., the weakening of a signal due to an obstruction between the signal's source and its destination.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an electronic device may include a first set of antennas; a second set of antennas; a first transceiver coupled to the first set of antennas, wherein the first transceiver may be configured to communicate with a network over a first frequency range via the first set of antennas. The electronic device may also include a second transceiver coupled to the second set of antennas, the second transceiver being configured to communicate with the network over a second frequency range via the second set of antennas. The electronic device may also include at least one processor communicatively coupled to the first transceiver and the second transceiver. The at least one processor may be configured to cause the first transceiver to communicate with the network over the first frequency range and cause the second transceiver to communicate with the network over the second frequency range. The at least one processor may determine or receive a signal characteristic of a signal received via the second transceiver. In response to determining that the signal characteristic is below a first threshold and greater than or equal to a second threshold, the at least one processor may cause the first transceiver or the second transceiver to send an indication to the network that the second transceiver is entering a suspend state, and cause the second transceiver to enter the suspend state. In response to determining that the signal characteristic is below the second threshold, the at least one processor may cause the first transceiver or the second transceiver to send an indication to the network that the second transceiver is entering a release state, and cause the second transceiver to enter the release state.

In another embodiment, a method may include communicating, via a first transceiver of an electronic device, with a network via a first frequency channel. The method may likewise include communicating, via a second transceiver of the electronic device, with the network via a second frequency channel. The method may include determining that a signal characteristic of a signal received via the first frequency channel and, in response to determining that the signal characteristic of the signal is below a first threshold and greater than or equal to a second threshold, sending a first indication to suspend data scheduling over the first frequency channel, and, in response to determining that the signal characteristic has dropped beneath the second threshold, sending a second indication to release the first frequency channel.

In yet another embodiment, one or more tangible, non-transitory, computer-readable media, comprising computer-readable instruction that, upon execution by one or more processors of an electronic device, may cause the one or more processors to receive or determine a first indication of whether signals are being sent or received over a first communication link provided by a first transceiver of the electronic device. The one or more processors may also receive or determine a second indication of whether an error rate of the signals sent or received over the first communication link exceeds a threshold, and determine to end the first communication link and use a second communication link provided by a second transceiver of the electronic device based on the first indication and the second indication.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
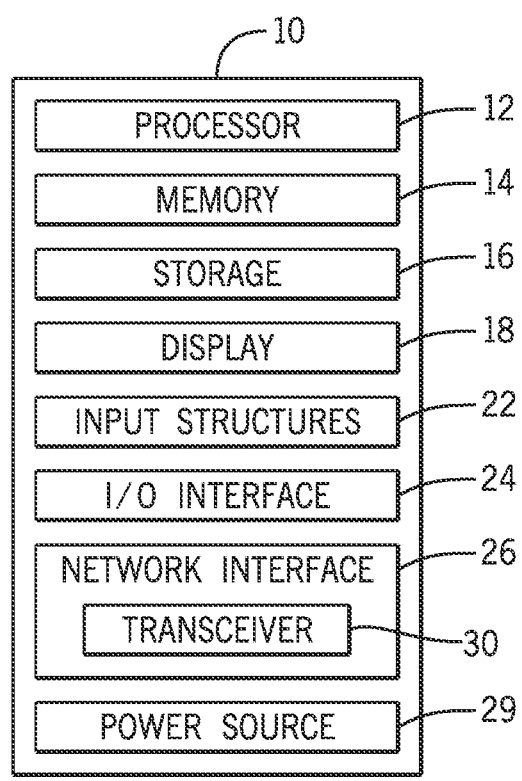
FIG. 1 is a block diagram of an electronic device, such as user equipment, according to an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the term "approximately," "near," "about", and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

This disclosure is directed to reducing power consumption and increasing data throughput by detecting a signal quality issue. In particular, user equipment may determine that the signal quality with a secondary cell group (SCG) link is compromised, and tune away from the secondary cell group link to a main cell group (MCG) link. It should be understood that "tune away" refers to releasing or ending a first connection with a first communication link and maintaining or establishing a second connection(s) with a second communication link(s). The user equipment may connect to an EN-DC (E-UTRAN New Radio— Dual Connectivity) network using a non-standalone (NSA) mode of operation; i.e., the network may support more than one network link (e.g., a fifth generation (5G) New Radio (NR) link and a fourth generation (4G) Long-Term Evolution (LTE) link simultaneously or concurrently). One link (e.g., the LTE link) may constitute the main cell group (MCG) while the other link (e.g., the 5G link) may constitute the secondary cell group (SCG). Each link may have various operation parameters that may lead to one link offering a more reliable connection and higher data throughput in one scenario, while being less favorable in another scenario. For example, the LTE link may provide a signal with lower throughput capability but greater reliability at farther distances, while the 5G link may offer certain frequency ranges (e.g., Frequency Range 2 (FR2), which may occupy the frequency range of 24 gigahertz (GHz) to 100 GHz) with greater throughput capability at closer distances and decreased reliability at farther distances. In particular, as the user equipment travels a greater distance away from a base station supporting the cellular connection, the FR2 signal of the 5G link may deteriorate until the network stops scheduling 5G data on the 5G link. In this scenario, the user equipment may not immediately detect that the network has stopped communicating with the user equipment over the 5G link—thus the user equipment may continue to send 5G uplink signals to the network, consuming power to maintain a connection with the 5G link while there is no throughput on the 5G link.

Embodiments herein provide various techniques for decreasing the time it takes user equipment to tune away from a compromised network connection. By more quickly detecting a signal quality issue in the compromised signal and performing mitigation actions, the user equipment may decrease or minimize power consumption and increase data throughput. In addition to saving power, this early tune-away may enable the user equipment to terminate the weak connection and request more component carriers to be allocated to the LTE link earlier, increasing data throughput. To do so, the embodiments disclosed herein include detecting signal quality issues and/or mitigating undesirable outcomes (e.g., excess power consumption and lower throughput) resulting from the compromised network connections.

A first issue detection method may include detection of high uplink block error rate (BLER) (e.g., above an uplink BLER threshold). Monitoring the BLER of a signal is a method of measuring the error rate of a signal. A number of "blocks" may be transmitted between devices (e.g., a base station and user equipment), and a ratio of the number of erroneous blocks (e.g., a block with an inaccurate cyclical redundancy check (CRC) value) to the total number of blocks sent may be calculated. Thus, $$BLER = \frac{\text{Number of Erroneous Blocks}}{\text{Total Number of Blocks Transmitted}},$$

and a lower BLER corresponds to a higher signal quality and vice versa. The user equipment may send uplink user data and may monitor the BLER of the uplink signal. If the BLER exceeds a predetermined BLER threshold, the user equipment may determine that it is uplink-limited and may take mitigation measures. While the BLER threshold (and any other threshold referenced in this disclosure) may be described as predetermined, in some embodiments, the user equipment may dynamically adjust the BLER threshold based on monitoring uplink performance.

Another method of issue detection may include detection of high uplink BLER and high downlink BLER. In a bidirectional traffic scenario, the user equipment may monitor the downlink and the uplink BLER. The user equipment may determine itself to be uplink limited if the uplink BLER exceeds an uplink BLER threshold, and/or may consider itself to be downlink limited if the downlink BLER exceeds a downlink BLER threshold.

Yet another method of issue detection may include detection of high downlink BLER due to discard of downlink retransmission. A network may transmit a first data packet in the downlink signal, and await an uplink transmission from the user equipment before transmitting a second data packet. The uplink signal from the user equipment may include an acknowledgement that the user equipment received the downlink signal. If the network does not receive that acknowledgement, the network may attempt to retransmit the first data packet via the downlink signal. If the user equipment receives the first data packet, transmits an uplink signal containing the acknowledgement, and receives the first data packet again, the user equipment may determine that there is an uplink signal quality issue.

Yet another method of issue detection may include detecting a primary uplink path configured to the LTE MCG. A network may include an EN-DC (E-UTRAN New Radio—Dual Connectivity) network using a non-standalone (NSA) mode of operation; i.e., the network may support more than one network link. The EN-DC network may configure a primary uplink path as either the 5G link or the LTE link. If the user equipment experiences deteriorating 5G signal, the network may reconfigure the primary uplink path from 5G to LTE. That is, if the user equipment detects that the network has reconfigured the primary uplink path from 5G to LTE, the user equipment may determine that there is a 5G signal quality issue.

Another method of issue detecting may include monitoring the data scheduled by the network. If the user equipment detects that the network has scheduled all downlink and uplink traffic on one link and none on the other, this may indicate to the user equipment that there is a signal quality issue. For example, if the user equipment monitors the downlink and uplink traffic scheduled by the network, and determines that the network has scheduled all uplink and downlink traffic on LTE and has scheduled no uplink and downlink traffic on 5G, the user equipment may determine that there is a 5G signal quality issue.

Another method of detecting signal quality issues may include monitoring the reference signal receiving power (RSRP) of a signal in a cell. RSRP is a measure of power level for wireless (e.g., 5G and LTE) signals. The user equipment may monitor the RSRP and evaluate an absolute RSRP value and/or a rate of change of the RSRP value over time. If the user equipment determines that the RSRP has degraded over time, the user equipment may determine that it is travelling away from the coverage of the cell and/or that the signal quality is degrading. The user equipment may take measures to tune-away upon detecting the signal quality degradation.

Yet another method of detecting signal quality issues may include detection of whether the user equipment has moved from an outdoors location to indoors. Some signals (e.g., FR2) may quickly deteriorate upon interference (such as the walls of a building) between the base station and the user equipment. Thus, the user equipment may monitor location data (e.g., GNSS (global navigation satellite system) or GPS (global positioning system data)) to determine if the user equipment has traveled to an indoor location, and tune-away in response to making the determination.

An additional or alternative method of detecting signal quality issues may include monitoring a channel impulse response of the user equipment. Monitoring the channel impulse response may enable determining a rate of speed at which the user equipment is traveling. This metric may be used by the user equipment to determine if and/or how soon the user equipment may be out of range of the base station it may be presently connected to, and thus may enable the user equipment to more quickly tune away from the link if the signal in the link is likely to degrade. While specific methods of detecting signal quality issues are disclosed, it should be understood that the disclosure may apply any other suitable method of detecting signal quality issues in addition to or in the alternative to those presently disclosed.

As to methods for mitigating undesirable outcomes resulting from the compromised network connections, the user equipment may, upon detecting the signal quality issue by applying one of the above methods, request that the network reduce the number of 5G component carriers and/or reduce the bandwidth over the 5G link. For example, the user equipment may set the requested 5G bandwidth to zero and/or the number of 5G carriers to zero to cause the network to release the 5G link. A second mitigation method may include early reporting of an SCG failure cause the network to release the SCG. A third method may include introducing new signaling to enable the user equipment to request SCG release or to transfer information on the related metrics to the network. An additional or alternative method may include establishing a state machine that may enable the user equipment and the network to agree on a level of communication based on the quality of a signal. This mitigation method will be discussed in greater detail below.

With the foregoing in mind, FIG. 1 is a block diagram of an electronic device 10, according to an embodiment of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including computer code stored on a computer-readable medium) or a combination of both hardware and software elements. The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in electronic device 10.

By way of example, the electronic device 10 may represent a block diagram of any suitable computing device, including a desktop computer, a notebook computer, a portable electronic or handheld electronic device (e.g., a wireless electronic device or smartphone), a tablet, a wearable electronic device, and other similar devices. In particular, the electronic device 10 may include user equipment or radio frequency communication devices, such as mobile communication devices, smartphones, tablets, wearable devices, and so on. In some embodiments, the electronic device 10 may include any suitable communication hub or node, such as a non-terrestrial network communication hub or node, a satellite communication hub or node, a base station, or a network operator. It should be noted that the processor 12 and other related items in FIG. 1 may be generally referred to herein as "data processing circuitry." Such data processing circuitry may be embodied wholly or in part as software, hardware, or a combination thereof. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein and below.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level).

The I/O interface 24 may enable electronic device 10 to interface with various other electronic devices, as may the network interface 26. The network interface 26 may include, for example, one or more interfaces for a personal area network (PAN), such as a BLUETOOTH® network, for a local area network (LAN) or wireless local area network (WLAN), such as a network employing one of the IEEE 802.11x family of protocols (e.g., WI-FTC)), and/or for a wide area network (WAN), such as any standards related to the Third Generation Partnership Project (3GPP), including, for example, a $3^{rd}$ generation (3G) cellular network, universal mobile telecommunication system (UMTS), 4th generation (4G) cellular network, long term evolution (LTE®) cellular network, long term evolution license assisted access (LTE-LAA) cellular network, 5th generation (5G) cellular network, and/or New Radio (NR) cellular network, and/or for a non-terrestrial network, such as a satellite communication network. In particular, the network interface 26 may include, for example, one or more interfaces for using a Release-15 cellular communication standard of the 5G specifications that include the millimeter wave (mmWave) frequency range (e.g., 24.25-300 gigahertz (GHz)). The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

Figure 2:
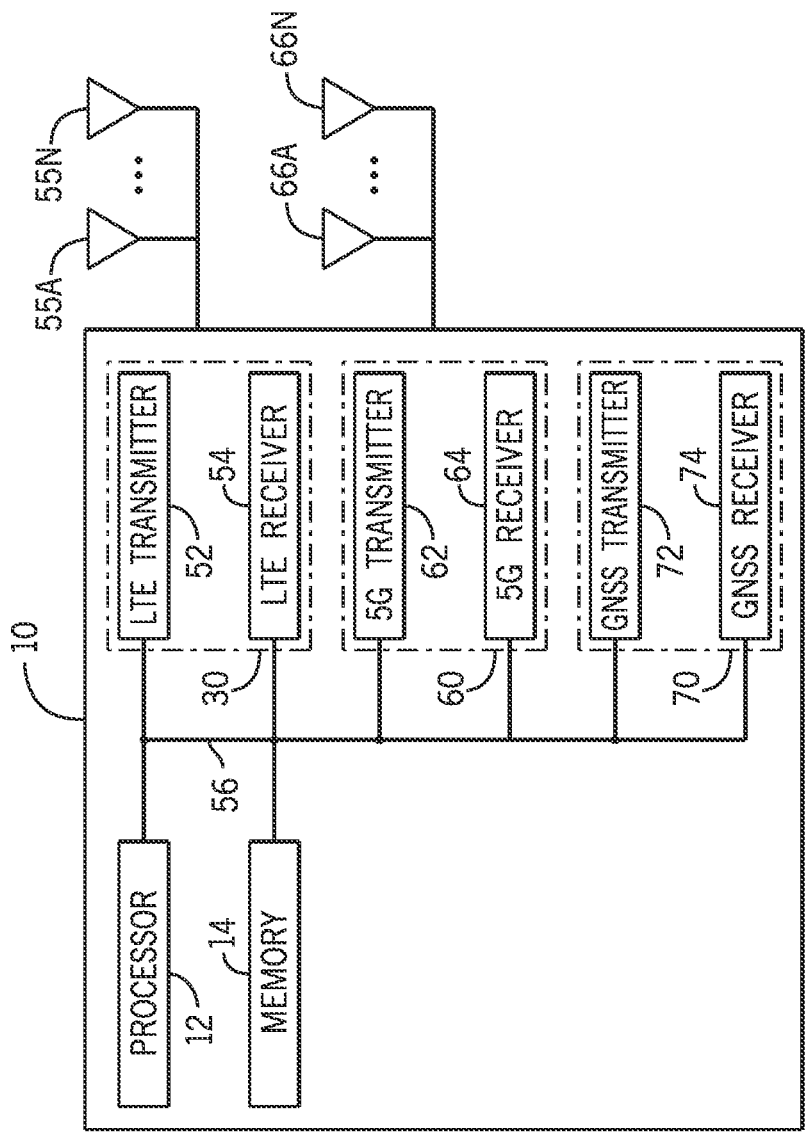
FIG. 2 is a functional block diagram of the electronic device of FIG. 1, according to an embodiment of the present disclosure.

As illustrated, the network interface 26 may include an LTE transceiver 30 and a 5G transceiver 60 (as shown in FIG. 2 below). In some embodiments, all or portions of the LTE transceiver 30 and the 5G transceiver 60 may be disposed within the processor 12. The LTE transceiver 30 and the 5G transceiver 60 may support transmission and receipt of various wireless signals via one or more antennas (also shown in FIG. 2 below). The power source 29 of the electronic device 10 may include any suitable source of power, such as a rechargeable lithium polymer (Li-poly) battery and/or an alternating current (AC) power converter. In certain embodiments, the electronic device 10 may take the form of a computer, a portable electronic device, a wearable electronic device, or other type of electronic device.

FIG. 2 is a functional block diagram of the electronic device 10 of FIG. 1, according to embodiments of the present disclosure. As illustrated, the processor 12, the memory 14, the LTE transceiver 30, an LTE transmitter 52, an LTE receiver 54, the 5G transceiver 60, a 5G transmitter 62, a 5G receiver 64, a GNSS transceiver 70, a GNSS transmitter 72, a GNSS receiver 74, a set of LTE antennas 55 (illustrated as 55A-55N) and/or a set of 5G antennas 66 (illustrated as 66A-66N) may be communicatively coupled directly or indirectly (e.g., through or via another component, a communication bus, a network) to one another to transmit and/or receive data between one another. It should be noted that the LTE and 5G antennas 55 and 66 may each include one or more antennas.

The electronic device 10 may include the LTE transmitter 52 and/or the LTE receiver 54 that respectively enable transmission and reception of LTE data between the electronic device 10 and a network via a base station (e.g., an Evolved Universal Terrestrial Radio Access Network (E-UTRAN) Node B (Evolved Node B, eNodeB, or eNB). As illustrated, the LTE transmitter 52 and the LTE receiver 54 may be combined into the LTE transceiver 30. Likewise, the 5G transmitter 62 and the 5G receiver 64 may be combined into the 5G transceiver 60 and the GNSS transmitter 72 and the GNSS receiver 74 may be combined into the GNSS transceiver 70. The GNSS transceiver may enable communication between the electronic device 10 (e.g., user equipment) and a GNSS satellite and/or GNSS satellite system. The electronic device 10 may also have one or more LTE antennas 55A-55N electrically coupled to the LTE transceiver 30, and one or more 5G antennas 66A-66N electrically coupled to the 5G transceiver 60. The antennas 55A-55N and 66A-66N may be configured in an omnidirectional or directional configuration, in a single-beam, dual-beam, or multi-beam arrangement, and so on. Each antenna 55 and 66 may be associated with one or more beams and various configurations. In some embodiments, multiple antennas of the antennas 55A-55N and 66A-66N may be communicatively coupled to a respective LTE transceiver 30 and/or 5G transceiver 60, and each emit radio frequency signals that may constructively and/or destructively combine to form a beam. The electronic device 10 may include the multiple transmitters 52 and 62, multiple receivers 54 and 64, multiple transceivers 30 and 60, and/or multiple antennas 55 and 66 as needed for various communication standards. In some embodiments, each of the LTE antennas 55A-55N may emit omnidirectional radio frequency signals, while each of the 5G antennas 66A-66N may be grouped as part of an antenna array, in which each 5G antenna 66 of an antenna array emits a radio frequency signal that constructively and/or destructively combines with other radio frequency signals emitted by other antennas 66 of the antenna array to form a directional beam.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

Figure 3:
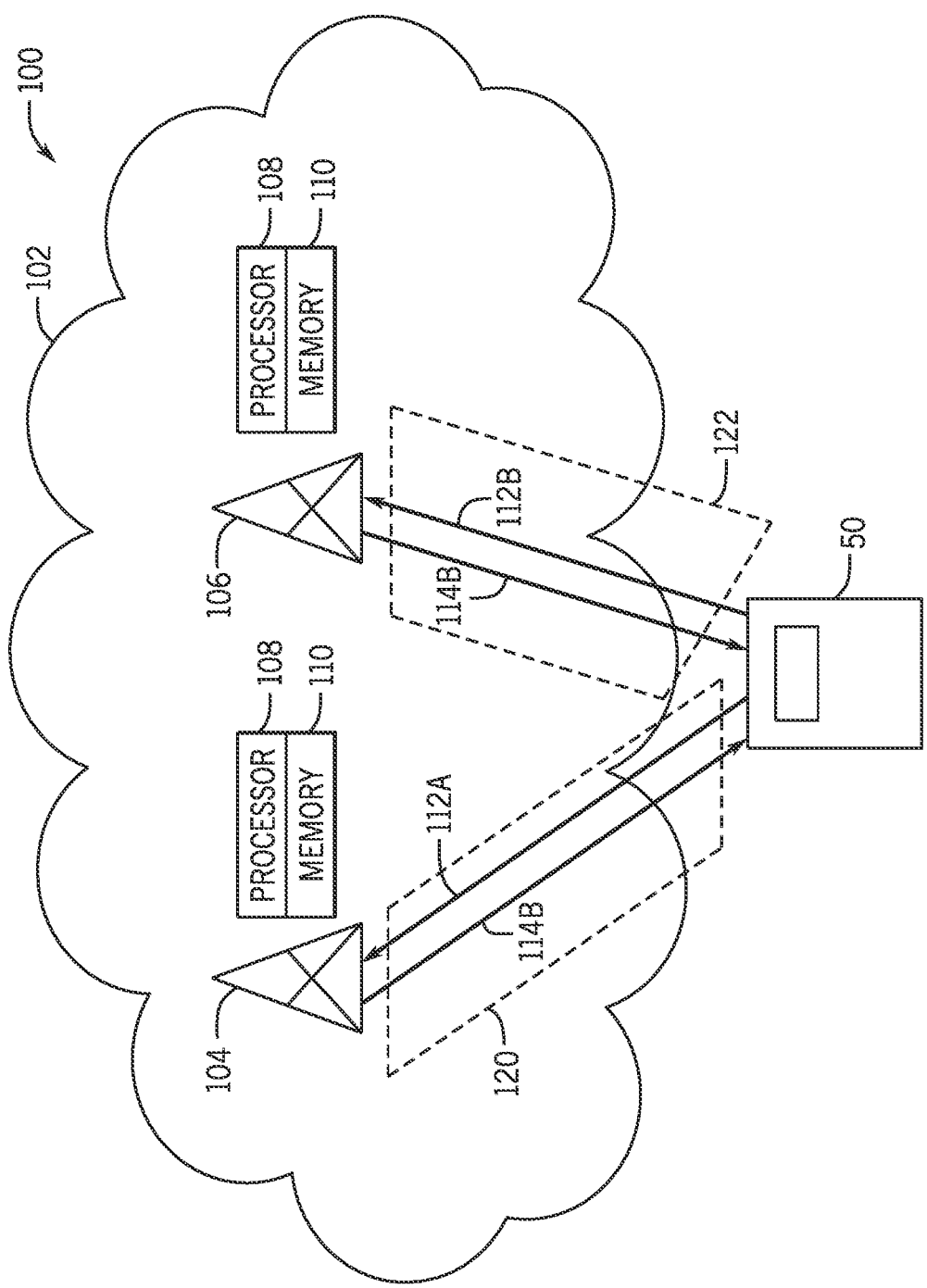
FIG. 3 is an illustration of a wireless communication system including a network and the user equipment of FIG. 1, according to an embodiment of the present disclosure.

FIG. 3 is a diagram of a network communication system 100, according to embodiments of the present disclosure. The network communication system 100 may include user equipment 50 (e.g., the electronic device 10), a network 102, an LTE base station 104 (e.g., eNodeB) and a 5G base station 106 (e.g., a next generation Node B (gNodeB or gNB)). The network 102 may be an EN-DC (E-UTRAN New Radio-Dual Connectivity) network using a non-standalone (NSA) mode of operation—i.e., the network 102 may support more than one network link (e.g., a 5G link via the 5G base station 106 and an LTE link using the LTE base station 104) simultaneously or concurrently. One link (e.g., the LTE link) may constitute the main cell group (MCG) while the other link (e.g., the 5G link) may constitute the secondary cell group (SCG). If, for example, the LTE link is the MCG and the 5G link is the SCG, the user equipment 50 may maintain a connection with the LTE base station 104, and the LTE base station 104 may control whether the user equipment 50 may communicate with the 5G base station 106. For example, while connected to the LTE base station 104 via an MCG link, the user equipment 50 may determine whether the 5G transceiver 60 has the proper configuration to support a 5G link via an SCG link. The user equipment 50 may report to the LTE base station 104, indicating that the 5G transceiver 60 has the proper configuration. The LTE base station 104 may then provide the user equipment 50 with the 5G cell configuration (e.g., the 5G center frequency), thus enabling the user equipment 50 to connect to the 5G base station 106.

Each base station 104 and 106 may have a corresponding processor 108 (e.g., one or more of an application processor and/or a baseband processor) and memory 110 to enable transmission of an LTE downlink signal 114A and a 5G downlink signal 114B (herein collectively referred to as downlink signals 114) to the user equipment 50 and reception of an LTE uplink signal 112A and a 5G uplink signal 112B (herein collectively referred to as uplink signals 112) from the user equipment 50. The user equipment 50 may communicate with the LTE base station 104 via the LTE uplink signal 112A and the LTE downlink signal 114A (collectively referred to as the LTE signal 120) transmitted and received via the LTE transceiver 30. Likewise, the user equipment 50 may communicate with the 5G base station 106 via the 5G uplink signal 112B and the 5G downlink signal 114 (collectively referred to as the 5G signal 122) transmitted and received via the 5G transceiver 60.

The user equipment 50 may communicate with the 5G base station 106 over frequency bands ranging from 7.125 GHz to approximately 100 GHz. In particular, the user equipment 50 may communicate with the 5G base station 106 over a lower frequency band, referred to herein as Frequency Range 1 (FR1), which may range from 7.125 GHz to approximately 24 GHz. The FR1 frequency band may overlap with the frequency bands in the LTE link. The user equipment 50 may also or alternatively communicate with the 5G base station 106 over a higher frequency band, referred to herein as Frequency Range 2 (FR2), which may range from approximately 24 GHz to approximately 100 GHz. The FR2 band may provide a stronger signal (e.g., provide greater throughput) at shorter distances (e.g., 100 meters to 200 meters) from the 5G base station 106 than signals in the FR1 band or the LTE signal 120, but may not be as reliable at longer distances or if there is interference (e.g., if the user equipment 50 is brought into a building). In contrast, signals within the FR1 band are more reliable than FR2 signals at greater distances (e.g., 500 meters to 2,000 meters) from the 5G base station 106 and in the presence of interference. Therefore, if conditions exist such that the signals in the FR2 band are compromised, the user equipment 50 may benefit from tuning away from FR2, and indeed tuning away from the 5G signal 122 altogether, which may enable allocating a greater amount of resources to the LTE signal 120, thus improving overall communication quality.

Figure 4:
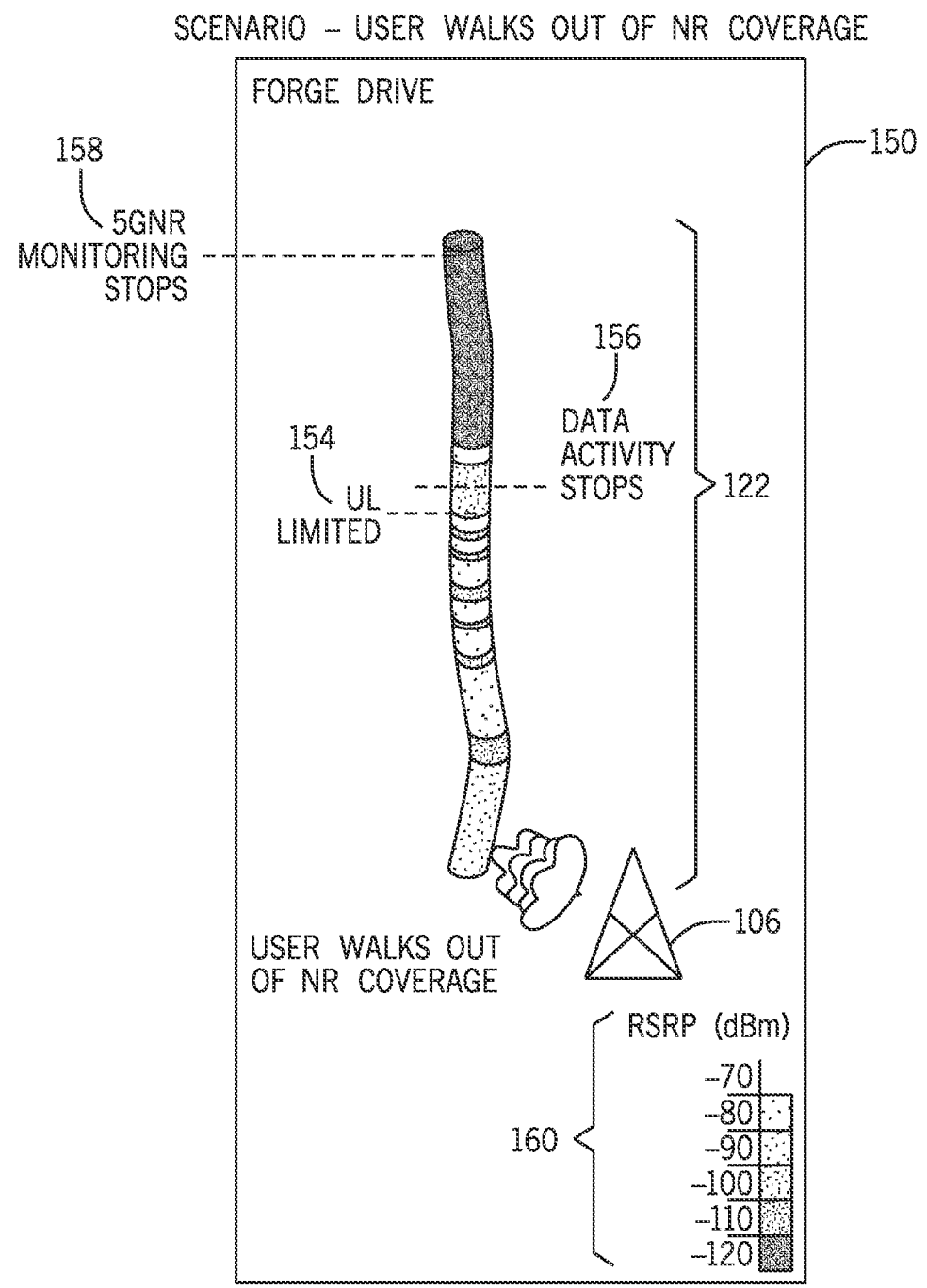
FIG. 4 is a perspective diagram of signal quality of signals as the user equipment travels away from a base station in the wireless communication system of FIG. 3.

FIG. 4 is a perspective diagram 150 representing signal quality of the 5G signal 122 as the user equipment 50 travels out of the coverage of the 5G base station 106. The 5G signal 122 may deteriorate not only due to the increased distance from the 5G base station 106, but due to the "blurring" or "shadowing" of the 5G signal 122, which may occur when there is an obstruction (e.g., a building or other structure) between the user equipment 50 and the 5G base station 106. As the user equipment 50 travels away from the 5G base station 106, the 5G downlink signal 114B may maintain signal quality while the signal quality of the 5G uplink signal 112B may deteriorate, causing the user equipment 50 to become uplink-limited. This may occur due to the asymmetry between the power of the uplink signal 112 and the power of the downlink signal 114—e.g., due to differences in the regulation of uplink and downlink signal strength. That is, a transmitter (e.g., that transmits 5G downlink signals 114B to the user equipment 50) of the 5G base station 106 may have less stringent power regulations than a receiver (e.g., that receives 5G uplink signals 112B from the user equipment 50) of the 5G base station 106, and thus may operate with greater power. If the user equipment 50 becomes uplink-limited, the network 102 (e.g., operating via the 5G base station 106) may not receive the 5G uplink signal 112B from the user equipment 50, and thus the network 102 may not respond to the 5G uplink signal 112B by transmitting the 5G downlink signal 114B to the user equipment 50. However, the user equipment 50 may continuously re-attempt to transmit the 5G uplink signal 112B to the 5G base station 106 (e.g., because it has not received a confirmation or a responding 5G downlink signal 114B), which results in the user equipment 50 consuming power to attempt to maintain the 5G link, despite there being no throughput on the 5G link. As described herein, the 5G link may be one or more frequency channels by which the user equipment may communicate with the 5G base station 106.

As may be seen from the reference signal received power (RSRP) monitor 160 in FIG. 4, as the user equipment 50 travels away from the 5G base station 106, the RSRP (i.e., a measure of signal power) of the 5G downlink signal 114B decreases from approximately −80 decibel-milliwatts (dBm) to −120 dBm. In particular, as the user equipment 50 reaches position 154, the 5G transceiver 60 of the user equipment 50 may become uplink-limited (e.g., the uplink signal 112 may be compromised). At the position 154, the network 102 may not receive the uplink signal 112 of the user equipment 50. As a consequence, at position 156 the network 102 may stop scheduling data via the 5G base station 106. At position 158, the user equipment 50 may stop monitoring the 5G link, and thus cease attempting to communicate with the network 102 via the 5G base station 106. As may be appreciated, during the period between when the network 102 stops scheduling data via the 5G base station 106 and when the user equipment 50 stops monitoring the 5G link (e.g., between the position 156 and the position 158) the user equipment 50 may consume power maintaining the 5G link while the 5G link provides no throughput to the user equipment 50.

Figure 5:
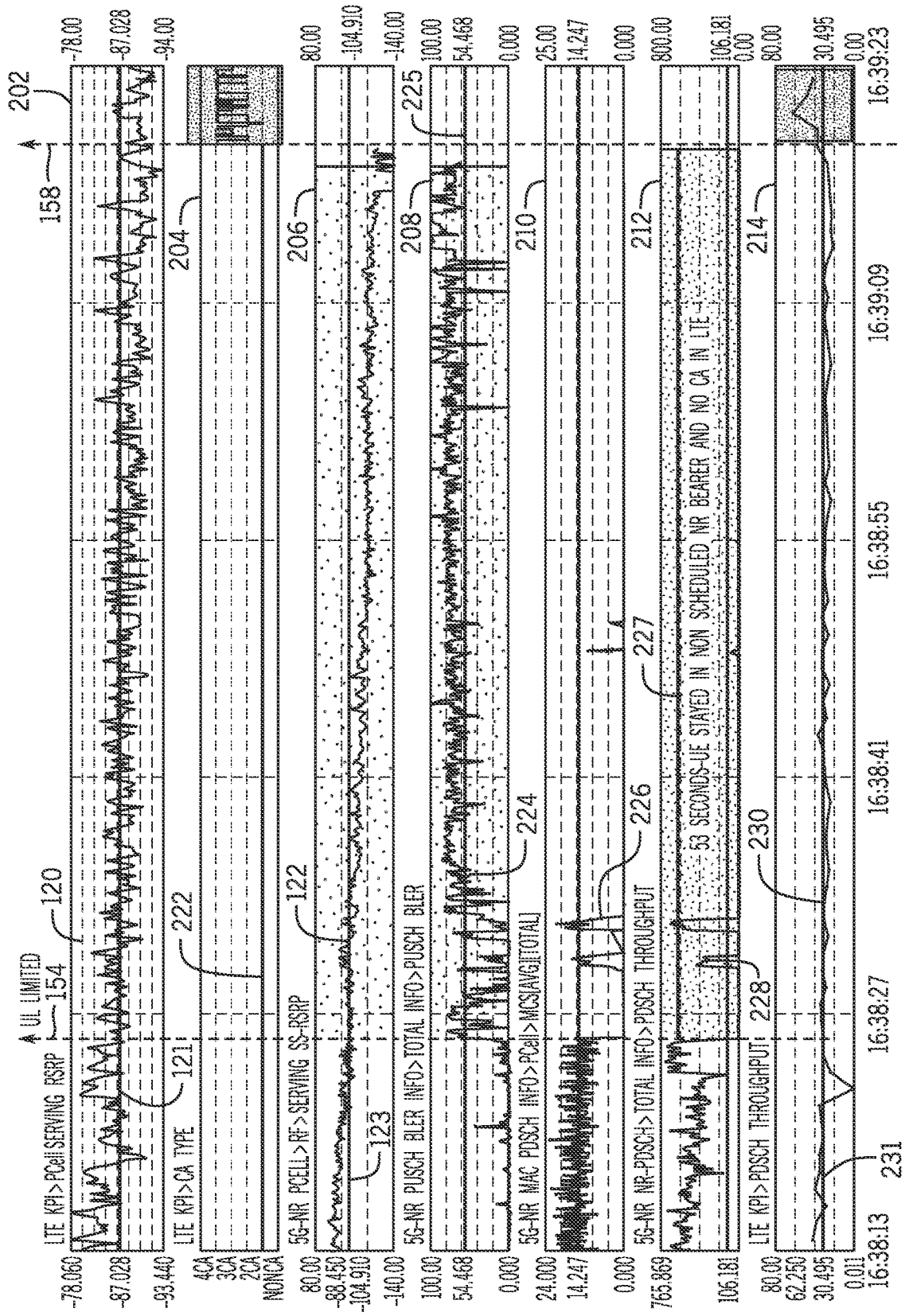
FIG. 5 is a set of plots illustrating different signal quality characteristics as the user equipment travels away from the base station in the wireless communication system of FIG. 3.

FIG. 5 is a set of plots illustrating different signal quality characteristics of the LTE signal 120 and the 5G signal 122 as the user equipment 50 travels out of the coverage of the base stations 104 and 106, as previously discussed in FIG. 4. In these plots, the LTE link may be the MCG and the 5G link may be the SCG.

Graph 202 illustrates the signal quality of the MCG (e.g., LTE signal 120) as the user equipment 50 travels away from the LTE base station 104. The LTE signal 120 gradually decreases, beginning above an average signal quality 121 of −87.028 dBm, reaching as high as −78.060 dBm, before falling below the average signal quality value 121, reaching as low as −93.440 dBm, once the user equipment 50 reaches the position 154 as shown in FIG. 4.

Similarly, graph 206 illustrates the signal quality of the SCG (e.g., 5G signal 122) as the user equipment 50 travels away from the 5G base station 106. The 5G signal 122 may begin around −88.450 dBm, then may fall to the average 5G signal quality 123 of −104.910 dBm. Once the user equipment 50 reaches the position 154 as shown in FIG. 4, the 5G signal 122 may deteriorate below the average 5G signal quality 123, reaching a minimum 5G signal quality of −140 dBm shortly before the user equipment reaches position 158. As may be seen from the graph 206, there is no signal quality of the 5G signal 122 monitored at the position 158. This is because both the user equipment 50 and the network 102 have stopped communicating via the 5G signal 122, and are only communicating via the LTE signal 120. As may be seen from graph 204, at the position 158, the LTE base station 104 may perform carrier aggregation; i.e., allocate additional carriers 222 to the LTE signal 120, increasing data throughput on the LTE signal 120.

Graph 208 illustrates the monitored block error rate (BLER) 224 of the uplink signal 112 of the 5G signal 122. As previously discussed, BLER is a method of measuring the quality of a signal. A number of "blocks" may be transmitted between devices (e.g., the 5G transceiver 60 of the user equipment 50 and the 5G base station 106), and a ratio of the number of erroneous blocks (e.g., a block with an inaccurate CRC value) to the total number of blocks sent may be calculated. As may be seen in the graph 208, the BLER is low (around 0% to 20%) when the quality of the 5G signal 122, shown in the graph 206, is above the average 5G signal quality 123 of −104.910 dBm. The BLER may increase as the quality of the 5G signal 122 deteriorates. Once the user equipment 50 reaches the position 154, the BLER may measure between 60% and 100% before the 5G link is terminated at the position 158. Thus, as the quality of the 5G signal 122 deteriorates, the number of erroneous blocks increases.

Graph 210 illustrates the modulating coding scheme (MCS) value 226 of the media access control (MAC) physical downlink shared channel (PDSCH) of the 5G signal 122. The MCS value 226 may indicate the number of "useful" bits that may be carried by a symbol, where the symbol is defined as a resource element (RE). Prior to the user equipment 50 becoming uplink-limited at the position 154, the MCS value 226 remains around an average MCS value 227 of 14.247 bits per RE. Upon the user equipment 50 becoming uplink-limited, the MCS value 226 drops to 0 bits per RE.

As previously stated, once the user equipment 50 becomes uplink limited (e.g., at the position 154), the network 102 may stop scheduling 5G data with the user equipment 50. However, the user equipment 50 may not immediately recognize that the network 102 has stopped scheduling 5G data, and thus may continue to attempt to communicate with the 5G base station 106, which may result in unnecessary power consumption and lower data throughput (e.g., as the user equipment 50 is attempting to communicate with the 5G base station 106 instead of performing carrier aggregation to increase throughput on the LTE signal 120). Graph 212 illustrates the 5G physical downlink shared channel (PDSCH) throughput 228 of the 5G signal 122. Similarly to the 5G signal quality of graph 210, the 5G PDSCH throughput 228 of the 5G signal 122 falls to 0.00 megabits per second (mbps) once the user equipment 50 becomes uplink-limited at the position 154. However, the user equipment 50 may attempt to maintain the 5G link for a period of time despite receiving no 5G downlink signal 114B from the 5G base station 106.

Graph 214 illustrates LTE PDSCH throughput 230 of the LTE signal 120. The LTE PDSCH throughput 230 may remain relatively constant at the average LTE PDSCH throughput 231 (e.g., approximately 30.495 mbps) before the user equipment 50 becomes uplink-limited on the 5G uplink signal 112B at position 156. The LTE PDSCH throughput 230 may remain relatively constant for the duration of time in which the user equipment 50 is uplink limited but attempting to maintain connection with the 5G base station 106. The LTE signal 120 may maintain an average level of LTE PDSCH throughput 230 due to the fact that the LTE signal 120 may be more reliable at greater distances, and thus the LTE signal 120 may still provide an average amount of throughput at the position 154 while the 5G signal 122 may not provide any throughput. However, once the network 102 releases the user equipment 50 from the 5G link, and the user equipment 50 allocates additional carriers 222 to the LTE signal 120 (as previously discussed in graph 204), the LTE PDSCH throughput 230 may increase and may reach as high as 60.00 mbps.

Figure 6:
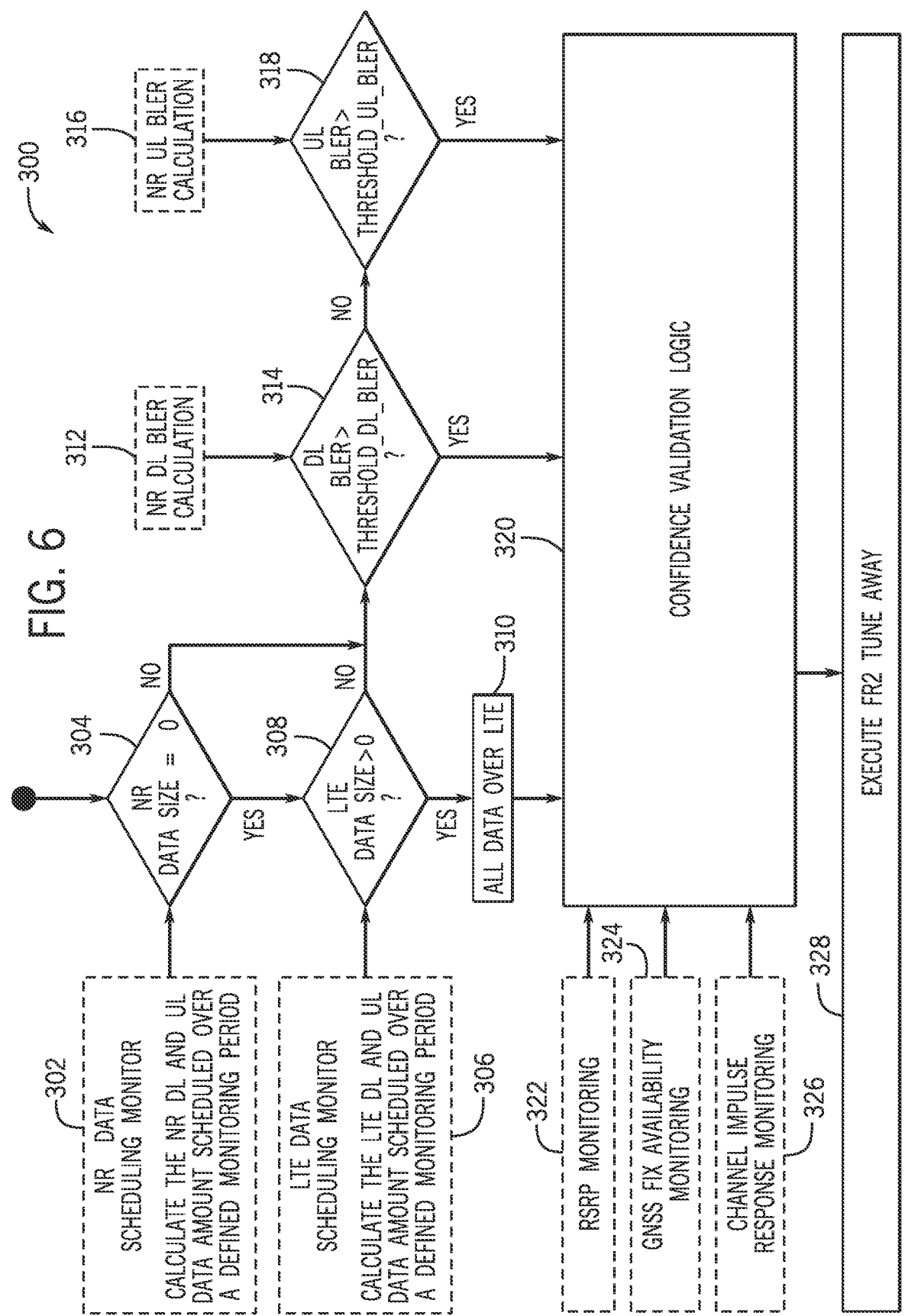
FIG. 6 is a flowchart of a method for early tune-away from the fifth generation (5G) New Radio (NR) Frequency Range 2 (FR2) frequency range, according to an embodiment of the present disclosure.

FIG. 6 is a flowchart of a method 300 for early tune-away from 5G NR FR2 frequency range, according to embodiments of the present disclosure. In particular, the method 300 may enable monitoring the signal quality of the LTE signal 120 and the 5G signal 122, and determining whether to execute FR2 tune-away based on a confidence validation logic 320. Any suitable device (e.g., a controller) that may control components of the user equipment 50, the LTE base station 104, and the 5G base station 106, such as the processor 12 of each of these devices or systems, may perform the method 300. In some embodiments, the method 300 may be implemented by executing instructions stored in a tangible, non-transitory, computer-readable medium, such as the memory 14 or storage 16, using the processor 12. For example, the method 300 may be performed at least in part by one or more software components, such as an operating system, one or more software applications, and the like, of the user equipment 50, the LTE base station 104, and the 5G base station 106. While the method 300 is described using steps in a specific sequence, it should be understood that the present disclosure contemplates that the described steps may be performed in different sequences than the sequence illustrated, and certain described steps may be skipped or not performed altogether.

In process block 302, the user equipment 50 monitors the 5G data that is scheduled by the network 102 via the 5G base station 106, and calculates data size of the 5G uplink signal 112B and data size of the 5G downlink signal 114B of the 5G signal 122. Similarly, in process block 306, the user equipment 50 monitors the LTE data that is scheduled by the network 102 via the LTE base station 104, and calculates a data size of the LTE uplink signal 112A and a data size of the LTE downlink signal 114A of the LTE signal 120. In query block 304, the user equipment 50 determines whether the uplink and downlink data size of the 5G signal 122 is equal to zero (e.g., there is no 5G data being scheduled by the network 102), and if the data size of the 5G signal 122 is equal to zero, the user equipment 50 then determines whether the data size of the LTE signal 120, calculated in the process block 306, is greater than zero, as may be seen in query block 308. If the user equipment 50 determines that the data size of the LTE signal 120 is greater than zero, then, in process block 310, the user equipment 50 requests, from the network 102, that all data be scheduled via the LTE base station 104.

In process block 312 and process block 316, the user equipment 50 may calculate the block error rate (BLER) of the 5G downlink signal 114B and the BLER of the 5G uplink signal 112B, respectively. If the query block 304 determines that the data size of the 5G signal 122 is not zero and the query block 308 determines that the data size of the LTE signal 120 is not greater than zero, then the user equipment 50 determines, in query block 314, whether the BLER of the 5G downlink signal 114B is greater than a threshold downlink BLER value. If the query block 314 returns a "yes," then this information is transmitted to the confidence validation logic 320. If the query block 314 returns a "no," then the user equipment 50 determines, in query block 318, whether the BLER of the 5G uplink signal 112B is greater than a threshold uplink BLER value, and, if so, transmits that determination to the confidence validation logic 320.

As previously stated, the method 300 may determine whether a signal quality issue is present for the LTE signal 120 and/or the 5G signal 122 and determine whether or not to execute FR2 tune-away. In particular, the confidence validation logic 320 may determine a level of confidence (e.g., represented as a percentage) that the 5G (e.g., FR2) connection will be lost (e.g., that the 5G/FR2 connection may no longer be capable of transferring data between the user equipment 50 and the 5G base station 106). Based on this confidence level, the confidence validation logic 320 may determine whether or not to execute FR2 tune-away, as shown in process block 328. The confidence validation logic 320 may be implemented in software (e.g., machine-executable instructions stored in the memory 14 or the storage 16), hardware (e.g., circuitry), or both, and include an algorithm performed by the processor 12 of the user equipment 50. The confidence validation logic 320 may base its determination on the metrics discussed above, e.g., the data size of the 5G signal 122 and the LTE signal 120, the downlink BLER of the 5G signal 122, and/or the uplink BLER of the 5G signal 122. In addition to those metrics, the confidence validation logic 320 also receives or determines, as shown in process block 322, information regarding a signal power (e.g., the RSRP, a received signal strength indicator (RSSI), or the like) and/or a signal quality (e.g., a signal-to-noise ratio (SNR), a reference signal received quality (RSRQ), or the like) of the LTE signal 120 and/or the 5G signal 122. In process block 324, the confidence validation logic 320 receives or determines GNSS location data; e.g., to determine a distance between the user equipment 50 and the LTE base station 104 or the 5G base station 106. In process block 326, the confidence validation logic 320 receives or determines channel impulse response data. A channel impulse response, as defined herein, refers to an output of a system when presented with a brief input signal (e.g., an impulse). Channel impulse response data may enable the user equipment 50 to determine a rate of speed that the user equipment 50 is traveling. The confidence validation logic 320 may take this into account to determine if and/or how quickly FR2 tune-away may be executed to decrease or minimize excess power consumption. The confidence validation logic 320 may receive these metrics, as well as others, from the processor 12 (e.g., a baseband processor) of the user equipment 50, as well as other components of the user equipment 50 (e.g., the GNSS receiver 74). The confidence validation logic 320 may additionally or alternatively utilize machine-learning to increase the speed and accuracy of the tune-away determination. As used herein, machine-learning may refer to algorithms and statistical models that computer systems (e.g., including the electronic device 10) use to perform a specific task with or without using explicit instructions. For example, a machine-learning process may generate a mathematical model based on a sample of data, known as "training data," in order to make predictions or decisions without being explicitly programmed to perform the task. Monitoring certain metrics discussed above (e.g., GNSS data and channel impulse response data) may enable the confidence validation logic 320 to anticipate degradation of the 5G signal 122. Thus, the confidence validation logic 320 may not only determine when the strength of the 5G signal 122 changes, but may determine if the strength of the 5G signal is likely to change, how the 5G signal 122 is likely to change (e.g., whether the 5G signal 122 will degrade or improve), and the rate at which the 5G signal 122 is likely to change. This may enable the confidence validation logic 320 to execute FR2 tune-away before the 5G connection is lost, which may result in lower power consumption. The confidence validation logic 320 may, using machine-learning, determine the relative importance of each of the metrics above and weight each metric accordingly. For example, if the confidence validation logic 320 determines that RSRP values monitored in the process block 322 more accurately indicate the signal characteristic of the 5G signal 122 than the channel impulse response monitored in the process block 326, the confidence validation logic 320 may accordingly weight the RSRP values higher than the channel impulse responses.

Depending on the inferences to be made, the confidence validation logic 320 may implement different forms of machine-learning. For example, in some embodiments (e.g., when particular known examples exist that correlate to future predictions or estimates that the machine-learning engine may be tasked with generating), a machine-learning engine may implement supervised machine-learning. In supervised machine-learning, a mathematical model of a set of data contains both inputs and desired outputs. This data is referred to as "training data" and may include a set of training examples. Each training example may have one or more inputs and a desired output, also known as a supervisory signal. In a mathematical model, each training example is represented by an array or vector, sometimes called a feature vector, and the training data is represented by a matrix. Through iterative optimization of an objective function, supervised learning algorithms may learn a function that may be used to predict an output associated with new inputs. An optimal function may allow the algorithm to correctly determine the output for inputs that were not a part of the training data. An algorithm that improves the accuracy of its outputs or predictions over time is said to have learned to perform that task.

Supervised learning algorithms may include classification and regression techniques. Classification algorithms may be used when the outputs are restricted to a limited set of values, and regression algorithms may be used when the outputs have a numerical value within a range. Similarity learning is an area of supervised machine-learning closely related to regression and classification, but the goal is to learn from examples using a similarity function that measures how similar or related two objects are. Similarity learning has applications in ranking, recommendation systems, visual identity tracking, face verification, and speaker verification.

Additionally and/or alternatively, in some situations, it may be beneficial for the machine-learning engine to utilize unsupervised learning (e.g., when particular output types are not known). Unsupervised learning algorithms take a set of data that contains only inputs, and find structure in the data, like grouping or clustering of data points. The algorithms, therefore, learn from test data that has not been labeled, classified, or categorized. Instead of responding to feedback, unsupervised learning algorithms identify commonalities in the data and react based on the presence or absence of such commonalities in each new piece of data.

That is, the machine-learning engine may implement cluster analysis, which is the assignment of a set of observations into subsets (called clusters) so that observations within the same cluster are similar according to one or more predesignated criteria, while observations drawn from different clusters are dissimilar. Different clustering techniques make different assumptions on the structure of the data, often defined by some similarity metric and evaluated, for example, by internal compactness, or the similarity between members of the same cluster, and separation, the difference between clusters. In additional or alternative embodiments, the machine-learning engine may implement other machine-learning techniques, such as those based on estimated density and graph connectivity. As such, the method 300 may enable the user equipment 50 to monitor the quality of the LTE signal 120 and the 5G signal 122, and may determine whether or not to execute FR2 tune-away.

Figure 7:
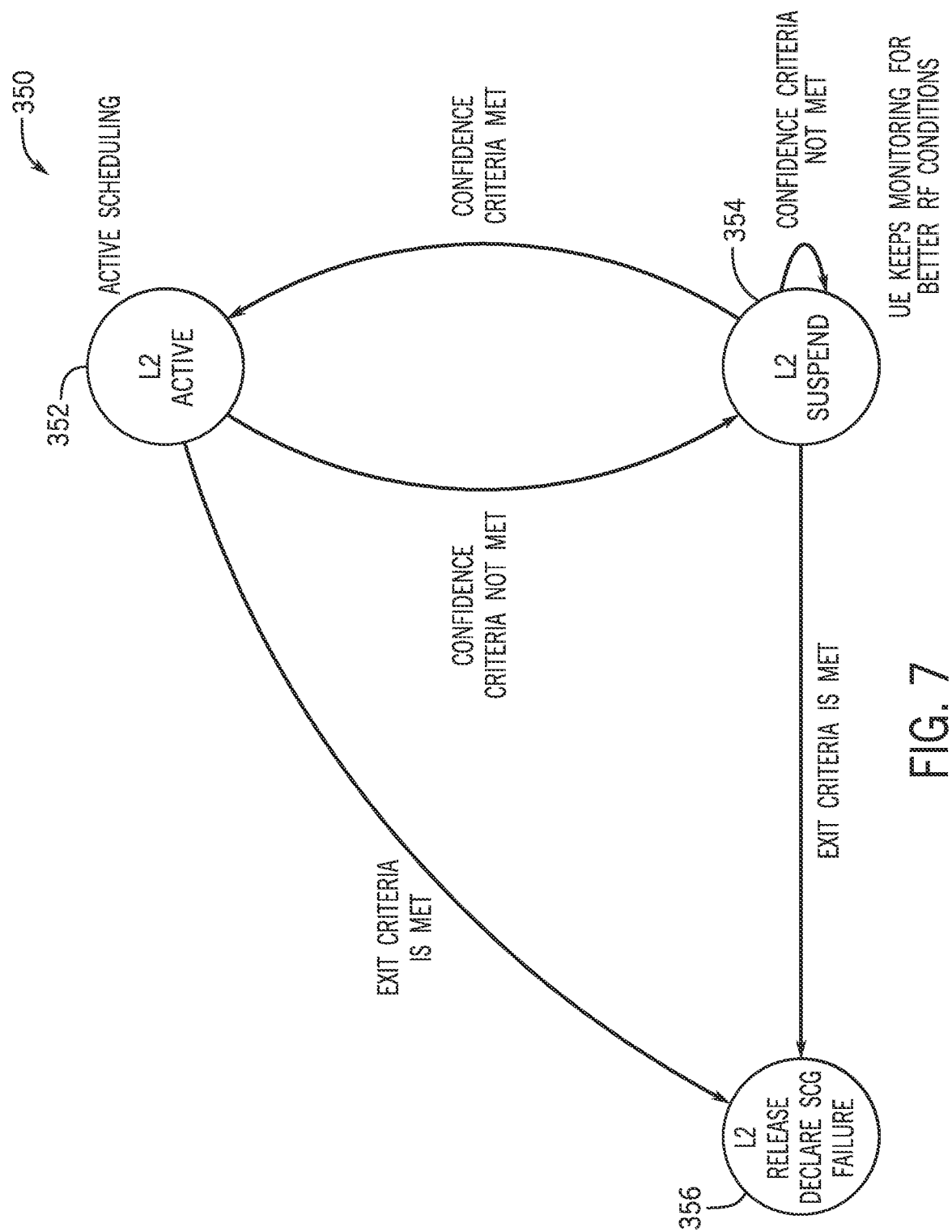
FIG. 7 is a diagram of a state machine of operating states in which the user equipment may operate based on the determination made in the method of FIG. 6, according to an embodiment of the present disclosure.

FIG. 7 is a diagram of a state machine 350 of operating states in which the user equipment 50 may operate depending on the output provided by the confidence validation logic 320 of FIG. 6, according to embodiments of the present disclosure. The state machine 350 may be implemented in Layer 2 (i.e., the data link layer or L2) of the network 102, and may transmit instructions to the processor 12, such that the processor 12 may configure the 5G transceiver 60 to operate in an active state 352, a suspend state 354, or a release state 356. In the active state 352, the user equipment 50 may establish a connection with the network 102 over the 5G link (e.g., an FR2 link) and/or the LTE link, and the network 102 may schedule data using the LTE base station 104 and/or the 5G base station 106. Upon considering the metrics described in FIG. 6 (e.g., the monitoring of the 5G signal 122, the monitoring of the LTE signal 120, RSRP monitoring, and so on), the confidence validation logic 320 may provide an output indicating whether the confidence criteria was met to determine whether the user equipment 50 may operate in the active state 352, the suspend state 354, or the release state 356. The output of the confidence validation logic 320 may be represented by a confidence percentage value (e.g., 0% to 20% may indicate low confidence and 80% to 100% may indicate high confidence).

The user equipment 50 may operate in only one state at a time. If, for example, the user equipment 50 is operating in the active state 352, the signal characteristic of the 5G signal 122 falls beneath a first threshold (e.g., the BLER of the 5G signal 122 exceeds a first BLER threshold, thus indicating a signal quality of the 5G signal 122 is of poorer signal quality), the confidence validation logic 320 indicates that that the confidence criteria is not met, then the confidence validation logic 320 may indicate a state change to the suspend state 354 to the processor 12. The first threshold may be any suitable signal quality or power value that is indicative of the user equipment 50 not receiving 5G signals from the 5G base station 106, the 5G base station 106 not receiving 5G signals from the user equipment 50, the network 102 not scheduling data with the user equipment 50 via the 5G base station 106, and so on. For example, the first threshold may include a signal characteristic of the 5G signal 122 that may result from or be associated with a first BLER threshold of the 5G signal 122 (e.g., where the first BLER threshold may include a BLER of 10% to 15%). Therefore, if the BLER of the 5G signal 122 is greater than or equal to 10%, then the signal characteristic of the 5G signal 122 may decrease below the first threshold, and as a result the processor 12 may cause the 5G transceiver 60 to exit the active state 352 and enter the suspend state 354.

In the suspend state 354, the user equipment 50 may monitor the 5G signal 122 over the 5G link less frequently, but still maintain the connection with the 5G link to determine if the characteristic of the 5G signal 122 increases (e.g., where the characteristic of the 5G signal 122 may include signal quality, signal power, or both). If the characteristic of the 5G signal 122 indeed increases above the first threshold (e.g., the BLER falls beneath the first BLER threshold) such that the confidence criteria of the confidence validation logic 320 is met, the processor 12 configures the 5G transceiver 60 to reenter the active state 352. However, if, while in either the suspend state 354 or the active state 352, the signal characteristic of the 5G signal decreases beneath a second threshold such that the confidence validation logic 320 indicates that an exit criteria is met (e.g., the BLER of the 5G signal exceeds a second BLER threshold), the processor causes the 5G transceiver 60 to enter into the release state 356. The second threshold may be any suitable signal quality or power value that is indicative of the user equipment 50 not receiving 5G signals from the 5G base station 106, the 5G base station 106 not receiving 5G signals from the user equipment 50, the network 102 not scheduling data with the user equipment 50 via the 5G base station 106, and so on. For example, the second threshold may include a signal characteristic of the 5G signal 122 that results from a BLER of 15%. Therefore, if the BLER of the 5G signal 122 measures less than or equal to 10%, then the confidence validation logic 320 may determine that the signal characteristic of the 5G signal 122 is above the first threshold, and thus the confidence criteria is met, and the 5G transceiver 60 may operate in the active state 352. If the BLER of the 5G signal 122 measures greater than 10% but less than or equal to 15%, the confidence validation logic 320 may determine that the signal characteristic of the 5G signal is below the first threshold and above the second threshold, and thus may indicate that the confidence criteria is not met, and the 5G transceiver 60 may operate in the suspend state. And if the BLER exceeds 15%, the confidence validation logic 320 may determine that the signal characteristic of the 5G signal 122 is below the second threshold, and thus may indicate that the exit criteria is met, and the processor 12 may cause the 5G transceiver 60 to enter the release state 356. To cause the 5G transceiver 60 to enter into the release state 356, the processor 12 may cause the 5G transceiver 60 to request, from the network 102, a release from the 5G link. Unlike operation in the suspend state 354, when operating in the release state 356, the processor 12 may deactivate the 5G transceiver 60, such that the 5G link between the user equipment 50 and the network 102 is terminated.

Figure 8:
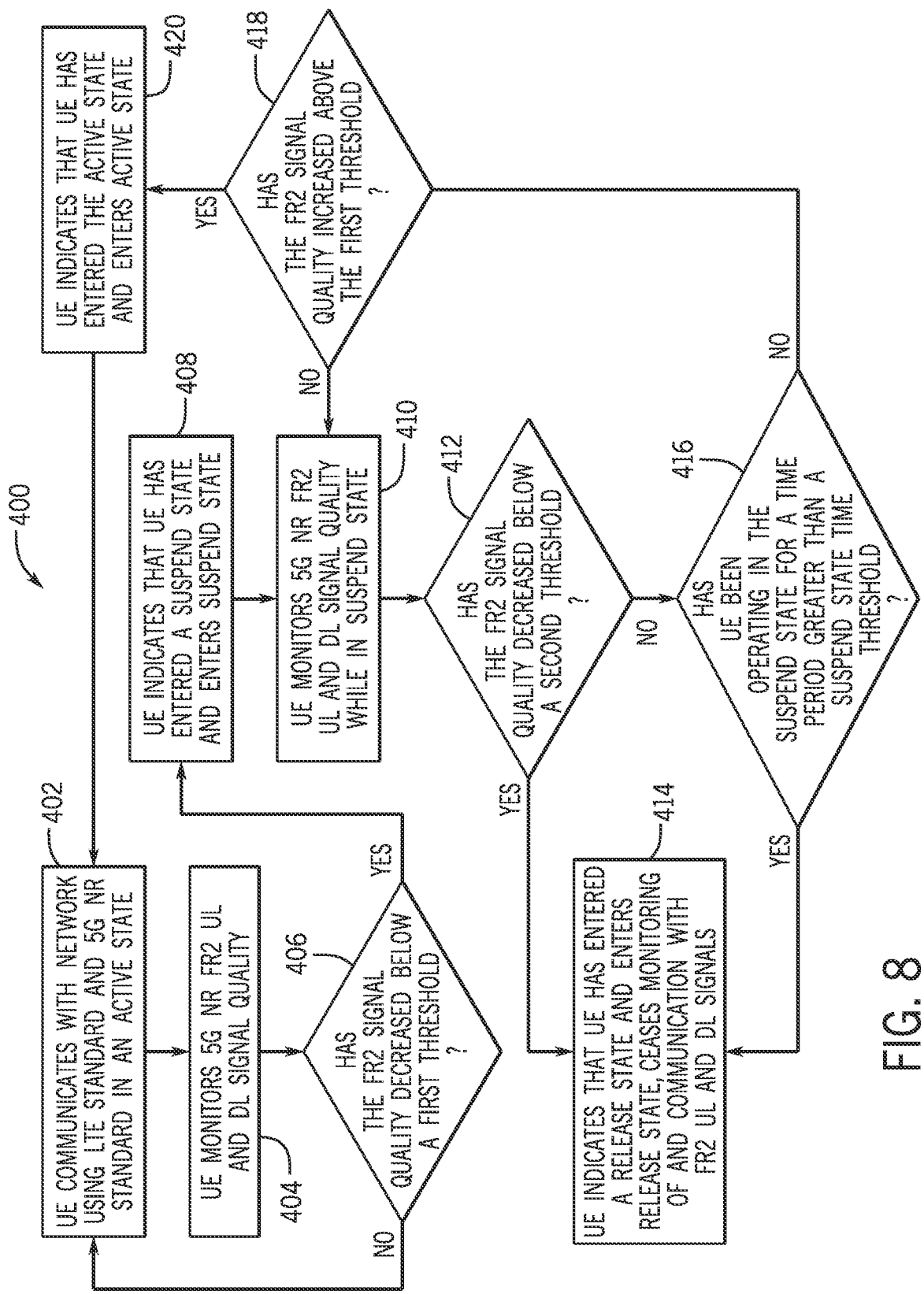
FIG. 8 is a flowchart of a method for transitioning the user equipment between states of the state machine of FIG. 7, according to an embodiment of the present disclosure.

FIG. 8 is a flowchart, from the perspective of the user equipment 50, of a method 400 for transitioning the user equipment 50 between states of the state machine 350 of FIG. 7, according to embodiments of the present disclosure. Any suitable device (e.g., a controller) that may control components of the user equipment 50, the LTE base station 104, and the 5G base station 106, such as the processor 12 of each of these devices or systems, may perform the method 400. In some embodiments, the method 400 may be implemented by executing instructions stored in a tangible, non-transitory, computer-readable medium, such as the memory 14 or storage 16, using the processor 12. For example, the method 400 may be performed at least in part by one or more software components, such as an operating system, one or more software applications, and the like, of the user equipment 50, the LTE base station 104, and the 5G base station 106. While the method 400 is described using steps in a specific sequence, it should be understood that the present disclosure contemplates that the described steps may be performed in different sequences than the sequence illustrated, and certain described steps may be skipped or not performed altogether.

In process block 402, the user equipment 50 operates in the active state 352, such that the user equipment 50 may communicate with the network 102 via the LTE base station 104 and the 5G base station 106. In process block 404, the processor 12 configures the 5G transceiver 60 to monitor the quality of the 5G uplink signal 112B and the 5G downlink signal 114B of the 5G signal 122. In query block 406, the user equipment 50 determines whether the characteristic of the 5G signal 122 has decreased below the first threshold (e.g., the BLER exceeds 10%). As previously stated, the user equipment 50 may communicate with the 5G base station 106 over frequency bands ranging from 7.125 GHz to approximately 100 GHz. The lower frequency band, referred to herein as FR1, may range from 7.125 GHz to approximately 24 GHz. The FR1 frequency band may overlap with the frequency ranges of the LTE signal 120 (e.g., 600 megahertz (MHz) to 5,000 MHz). The higher frequency band, referred to herein as FR2, may range from approximately 24 GHz to approximately 100 GHz. The FR2 band may provide a stronger signal (e.g., provide greater throughput) at shorter distances from the 5G base station 106 than signals in the FR1 band, but may not be as reliable at greater distances or if there is interference (e.g., if the user equipment 50 enters a building). Signals within the FR1 band may be more reliable than FR2 signals at greater distances from the 5G base station 106 and in the presence of interference. Therefore, if conditions exist such that the signals in the FR2 band are compromised, the user equipment 50 may benefit from tuning away from FR2, and indeed tuning away from the 5G signal 122 altogether, and allocating a greater amount of resources to the LTE signal 120.

If the user equipment 50 determines in query block 406 that the 5G signal 122 in the FR2 band has not decreased below a first threshold (e.g., the BLER of the 5G signal 122 is at or below 10%), the user equipment 50 may continue to operate in the active state 352 such that the network 102 continues to schedule data over both the LTE link and the 5G link. In process block 408, if the user equipment 50 determines that the characteristic of the 5G signal 122 in the FR2 band has dropped below the first threshold but has not fallen beneath the second threshold (e.g., the BLER of the 5G signal 122 is greater than 10% but less than or equal to 15%), the user equipment 50 indicates to the network 102 that it has entered the suspend state 354, and enters the suspend state 354. In process block 410, the user equipment 50, operating in the suspend state 354, continues to monitor, at a reduced rate, the 5G signal 122, as discussed in FIG. 7 above. In query block 412, the user equipment 50 determines whether the 5G signal 122 has fallen beneath the second threshold (e.g., the BLER of the 5G signal 122 is greater than 15%). In process block 414, if the 5G signal 122 has fallen beneath the second threshold, then the user equipment 50 transmits a request to the network 102 to release the user equipment 50 from the 5G link (e.g., by terminating communication between the user equipment 50 and the 5G base station 106). Once the network 102 releases the user equipment 50 from the 5G link, the user equipment 50 indicates to the network 102 that the user equipment 50 has entered the release state 356 and enters the release state 356, as discussed in FIG. 7.

However, if, in query block 412, the user equipment 50 determines that that the signal quality of the 5G signal 122 has not decreased below the second threshold, then the user equipment 50, in process block 416, determines whether the user equipment 50 has operated in the suspend state 354 for a time period greater than a suspend state time threshold. As previously stated, the user equipment 50 monitors the 5G signal 122 less frequently in the suspend state 354 than it does in the active state 352, and stops monitoring the 5G signal 122 in the release state 356. Therefore the user equipment may consume less power in the suspend state 354 than in the active state 352, and may consume less power in the release state 356 than the suspend state 354. If the user equipment 50 remains in the suspend state 354 for an extended period of time, it may indicate that the 5G signal 122 is not improving. Thus, at a certain time threshold (e.g., the suspend state time threshold) the cost of the power consumed to maintain the 5G link may exceed a potential benefit of the network 102 reestablishing communication with the user equipment over the 5G link. For this reason, the processor 12 of the user equipment 50 may monitor the time spent in the suspend state 354, and if the processor 12 determines that the user equipment has operated in the suspend state 354 for longer than the suspend state time threshold, the processor 12 may cause the user equipment 50 to enter the release state 356. The suspend state time threshold may be any suitable amount of time at which the cost of operating the 5G transceiver 60 outweighs the potential benefit (e.g., increased throughput) of reestablishing the 5G link. For example, the suspend state time threshold may include a time period of greater than or equal to 5 seconds, greater than 10 seconds, greater than 30 seconds, greater than 90 seconds, greater than five minutes, and so on.

If the user equipment 50 has been operating in the suspend state 354 for a time period greater than the suspend state time threshold, the user equipment may request release from the 5G link, as discussed above in the process block 414. If the user equipment 50 has not been operating in the suspend state 354 for a time period longer than the suspend state time threshold, then the user equipment 50 continues operating in the suspend state 354. In query block 418, the user equipment 50, while operating in the suspend state 354, determines whether the quality of the 5G signal 122 has increased above the first threshold. If the quality of the 5G signal 122 has not increased above the first threshold, the user equipment 50 continues to operate in the suspend state. However, if the 5G signal 122 characteristic does increase above the first threshold, then, in process block 420, the user equipment 50 transmits an indication to the network 102 that the user equipment 50 is reentering the active state 352, and the user equipment 50 reenters the active state 352. As noted in FIG. 7, the user equipment 50 may, while in the active state 352, detect that the signal quality of the 5G signal 122 has fallen beneath the second threshold. In this case, the user equipment may request a release from the 5G connection directly from the active state 352, without ever entering the suspend state 354. In this manner, the method 400 may enable the user equipment 50 to transition through the various states of the state machine 350.

Figure 9:
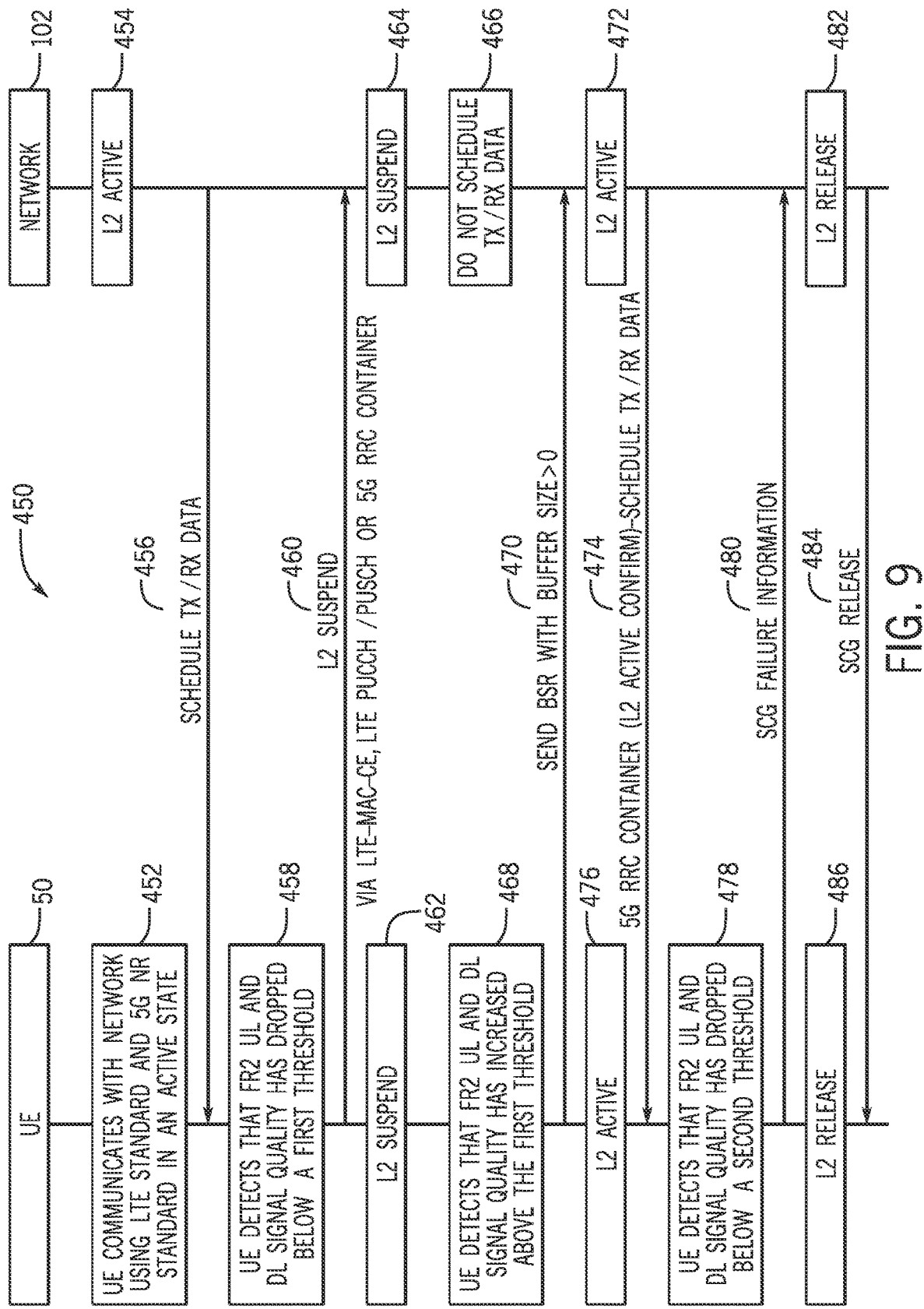
FIG. 9 is a flowchart of the method of FIG. 8 from the perspective of the user equipment and the network of the wireless communication system of FIG. 3, according to an embodiment of the present disclosure.

FIG. 9 is a flowchart, from the perspective of the user equipment 50 and the network 102, of a method 450 for transitioning the user equipment 50 from state-to-state of the state machine 350, as discussed in FIG. 7 and FIG. 8 above, according to embodiments of the present disclosure. In particular, the method 450 illustrates an example application of the state machine 350 discussed in FIG. 7 and/or the method 400 of FIG. 8, in operation. Any suitable device (e.g., a controller) that may control components of the user equipment 50, the LTE base station 104, and the 5G base station 106, such as the processor 12 of each of these devices or systems, may perform the method 450. In some embodiments, the method 450 may be implemented by executing instructions stored in a tangible, non-transitory, computer-readable medium, such as the memory 14 or storage 16, using the processor 12. For example, the method 450 may be performed at least in part by one or more software components, such as an operating system, one or more software applications, and the like, of the user equipment 50, the LTE base station 104, and the 5G base station 106. While the method 450 is described using steps in a specific sequence, it should be understood that the present disclosure contemplates that the described steps may be performed in different sequences than the sequence illustrated, and certain described steps may be skipped or not performed altogether.

In process block 452, the user equipment 50 operates in the active state 352, enabling the user equipment 50 to communicate with the network 102 via the 5G base station 106 and the LTE base station 104. In process block 454, the network 102 acknowledges that the user equipment 50 is operating in the active state 352 and accordingly may schedule transmission and reception data as shown in action 456. In process block 458, the user equipment 50 detects that the 5G signal 122 (e.g., in the FR2 band) has dropped below the first threshold. In action 460, the user equipment 50 transmits an indication to the network 102 that the user equipment 50 is entering the suspend state 354. The suspend state indication may be transmitted via the LTE signal 120 or the 5G signal 122. For example, the suspend state indication may be transmitted via LTE MAC-CE (Media Access Control-Control Element), LTE PUCCH/PUSCH (Physical Uplink Control Channel/Physical Uplink Shared Channel), a 5G RRC (Radio Resource Control) container, using the LTE signal 120, if the 5G uplink signal 112B is compromised. However, if the 5G signal 122 characteristic (e.g., as previously stated, the characteristic including signal quality, signal power, or both) is sufficiently high (e.g., greater than the first threshold), the user equipment 50 may transmit the indication a 5G RRC (Radio Resource Control) container via the 5G signal 122. In process block 462, the user equipment 50 enters the suspend state 354. In process block 464, the network 102 acknowledges that the user equipment 50 has entered the suspend state 354, and in process block 466, the network 102 stops scheduling 5G data (e.g., to send to or receive from the user equipment 50).

In process block 468, the user equipment 50 detects that the characteristic of the 5G signal 122 (e.g., the quality and/or power of the 5G uplink signal 112B, the quality and/or power of the 5G downlink signal 114B, or the quality and/or power of both) has increased above the first threshold. In response, in action 470, the user equipment 50 sends a buffer status report (BSR) to the network 102 indicating a buffer size that is greater than zero (e.g., indicating that the user equipment 50 has uplink data to transmit). In process block 472, the network 102 acknowledges that the user equipment 50 is entering the active state 352, and, in action 474, schedules 5G data with the user equipment 50. The network 102 transmits a confirmation that the user equipment 50 has entered the active state 352 using the 5G RRC container as the characteristic (e.g., signal quality, signal power, or both) of the 5G signal 122 is sufficiently high to transmit data (e.g., is above the first threshold). In process block 476, the user equipment 50 enters the active state 352. In process block 478, the user equipment 50 detects that the characteristic of the 5G signal 122 has fallen below the second threshold. In action 480, the user equipment 50 transmits (e.g., via the LTE signal 120, as the 5G signal 122 is compromised or has failed) a request release from the 5G connection by transmitting the signal failure of the 5G signal 122 (e.g., failure of the SCG signal). In process block 482 the network 102 may grant the release, and in action 484, release the user equipment 50 from the 5G link (e.g., terminates or ends the 5G connection with the user equipment 50). In process block 486, the user equipment 50 may enter the release state 356 (e.g., and cease communication via or monitoring the 5G connection). In this manner, the method 450 may enable the user equipment 50 to transition from one state to another in the state machine 350.

Figure 10:
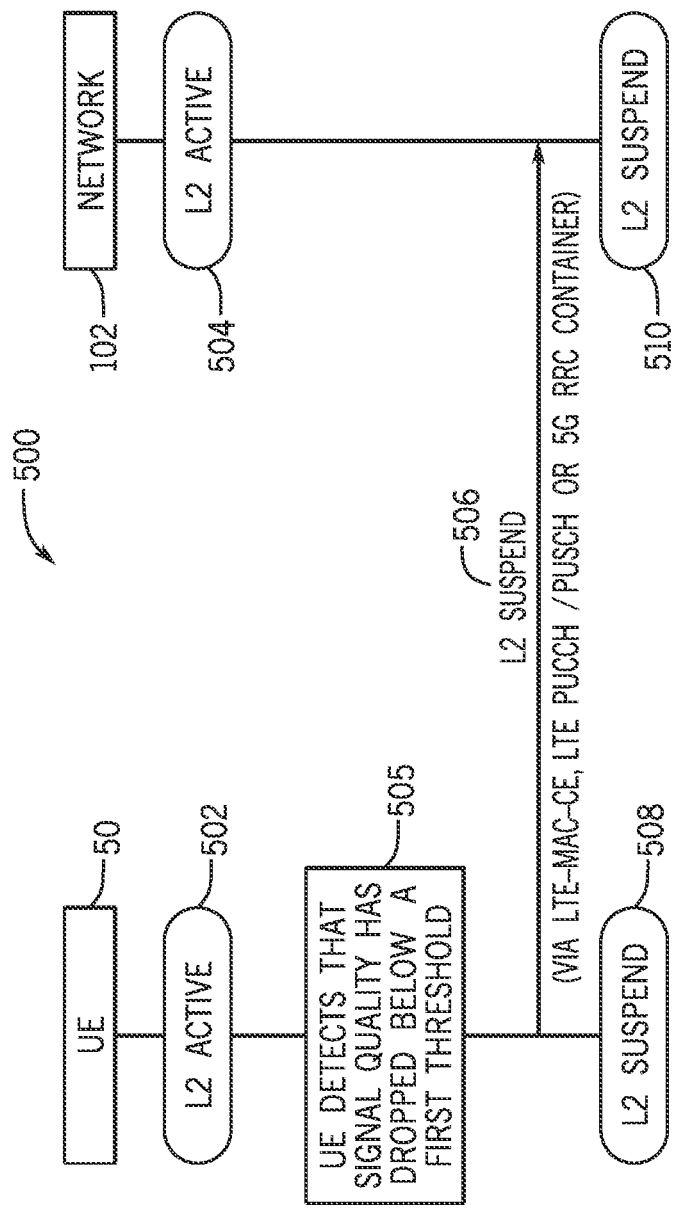
FIG. 10 is a flowchart of a method for transitioning the user equipment from an active state to a suspend state of the state machine of FIG. 7, according to an embodiment of the present disclosure.

FIG. 10 is a flowchart of a method 500 for transitioning the user equipment 50 from the active state 352 of the state machine 350 to the suspend state 354, according to embodiments of the present disclosure. Any suitable device (e.g., a controller) that may control components of the user equipment 50, the LTE base station 104, and the 5G base station 106, such as the processor 12 of each of these devices or systems, may perform the method 500. In some embodiments, the method 500 may be implemented by executing instructions stored in a tangible, non-transitory, computer-readable medium, such as the memory 14 or storage 16, using the processor 12. For example, the method 500 may be performed at least in part by one or more software components, such as an operating system, one or more software applications, and the like, of the user equipment 50, the LTE base station 104, and the 5G base station 106. While the method 500 is described using steps in a specific sequence, it should be understood that the present disclosure contemplates that the described steps may be performed in different sequences than the sequence illustrated, and certain described steps may be skipped or not performed altogether.

In process block 502, the user equipment 50 operates in the active state 352, and as such, in process block 504, the network 102 communicates with the user equipment 50 in the active state 352 (e.g., the network 102 schedules data to send to or receive from the user equipment 50 via the LTE base station 104 and the 5G base station 106). In process block 505, the user equipment 50 detects that the 5G signal 122 (e.g., in the FR2 band) has dropped below the first threshold. In action 506, the user equipment 50, in response to determining that that the 5G signal 122 has dropped below the first threshold, transmits an indication to the network 102 that the user equipment is entering the suspend state 354. However, if the user equipment 50 does not determine that the 5G signal 122 has dropped below the first threshold, the user equipment 50 may remain in the active state 352. The suspend state indication may be transmitted via the LTE signal 120 or the 5G signal 122. For example, the suspend state indication may be transmitted via LTE MAC-CE (Media Access Control-Control Element), or via LTE PUCCH/PUSCH (Physical Uplink Control Channel/Physical Uplink Shared Channel) if the 5G signal 122 is compromised. However, if the characteristic of the 5G signal 122 is sufficiently high (e.g., greater than the first threshold), the user equipment 50 may transmit the indication via 5G RRC (Radio Resource Control) container. In process blocks 508 and 510, the user equipment 50 enters the suspend state 354, and the network 102 acknowledges or is aware that the user equipment 50 has entered the suspend state 354. As such, the method 500 enables the user equipment 50 to transition from the active state 352 to the suspend state 354 of the state machine 350.

Figure 11:
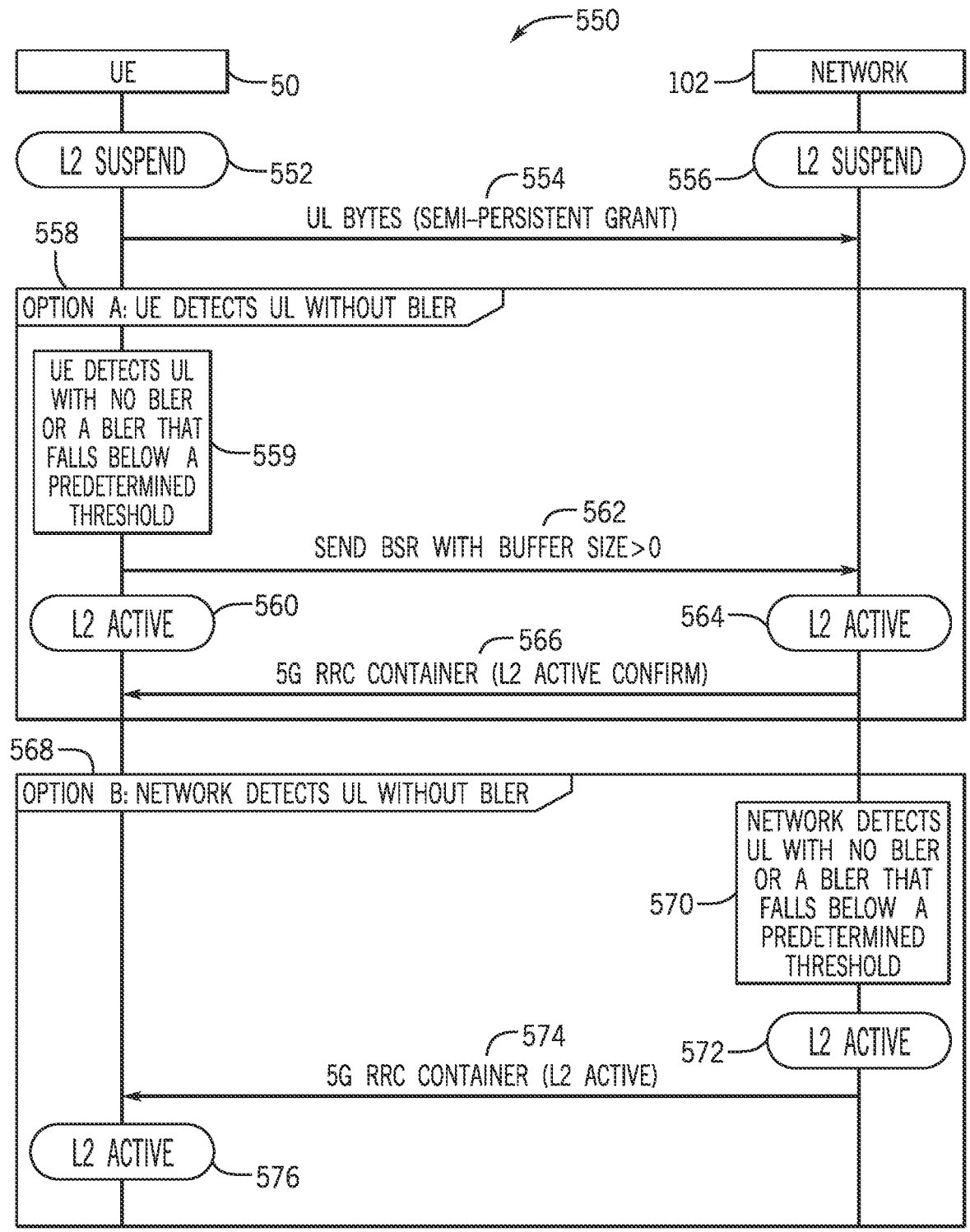
FIG. 11 is a flowchart of a method for transitioning the user equipment from the suspend state to the active state of the state machine of FIG. 7, according to an embodiment of the present disclosure.

FIG. 11 is a flowchart of a method 550 for transitioning the user equipment 50 from the suspend state 354 to the active state 352 of the state machine 350, according to embodiments of the present disclosure. Any suitable device (e.g., a controller) that may control components of the user equipment 50, the LTE base station 104, and the 5G base station 106, such as the processor 12 of each of these devices or systems, may perform the method 450. In some embodiments, the method 550 may be implemented by executing instructions stored in a tangible, non-transitory, computer-readable medium, such as the memory 14 or storage 16, using the processor 12. For example, the method 550 may be performed at least in part by one or more software components, such as an operating system, one or more software applications, and the like, of the user equipment 50, the LTE base station 104, and the 5G base station 106. While the method 550 is described using steps in a specific sequence, it should be understood that the present disclosure contemplates that the described steps may be performed in different sequences than the sequence illustrated, and certain described steps may be skipped or not performed altogether.

In process block 552, the user equipment 50 operates in the suspend state 354. As may be observed in process block 556, the network 102 acknowledges or is aware that the user equipment 50 is in the suspend state 354, and pauses scheduling data with the user equipment 50. In action 554, the user equipment 50 transmits a semi-persistent grant (e.g., of a certain transport block size/MCS value) to send uplink bytes to monitor if the 5G uplink signal 112B improves. There may be at least two alternative ways to determine whether the conditions of the uplink signal 112 have improved. Block 558 illustrates a first option. In process block 559 of block 558, the user equipment 50 detects the 5G uplink signal 112B with no BLER or a BLER that falls below a predetermined threshold (e.g., below the first BLER threshold of 10% BLER). In the action 562, the user equipment 50 transitions to the active state 352 and informs the network 102 by transmitting a BSR with a buffer size greater than zero. However, if the user equipment 50 determines that the 5G uplink signal 112B has a BLER that is above the first BLER threshold, the user equipment may remain in the suspend state 354. In process block 564, the network 102 acknowledges or is aware that the user equipment 50 is in the active state 352, and thus begin actively scheduling data with the user equipment 50. In action 566, the network 102 sends a confirmation that it is actively scheduling data to the user equipment 50. In process block 560, the user equipment 50 enters into the active state 352. A second option for determining that the 5G uplink signal 112B has improved and transitioning from the suspend state 354 to the active state 352 is illustrated in block 568. In process block 570 of block 568, the network 102 monitors the BLER of the 5G uplink signal 112B in the communication channel, and detects that the 5G uplink signal 112B has a BLER equal to 0% or a BLER that falls below a predetermined BLER threshold. The predetermined BLER threshold may be the same as that mention with respect to block 558 above (e.g., the first BLER threshold). In process block 572, the network 102 determines that the 5G uplink signal 112B of the user equipment 50 is sufficiently strong that the network 102 may begin actively scheduling 5G data on the user equipment 50. In action 574, the network 102 sends a confirmation of active scheduling via the 5G base station 106 to the user equipment 50. In process block 576, the user equipment 50 enters the active state 352. As such, the method 550 may enable the user equipment 50 or the network 102 to transition the user equipment 50 from the suspend state 354 to the active state 352 of the state machine 350.

Figure 12:
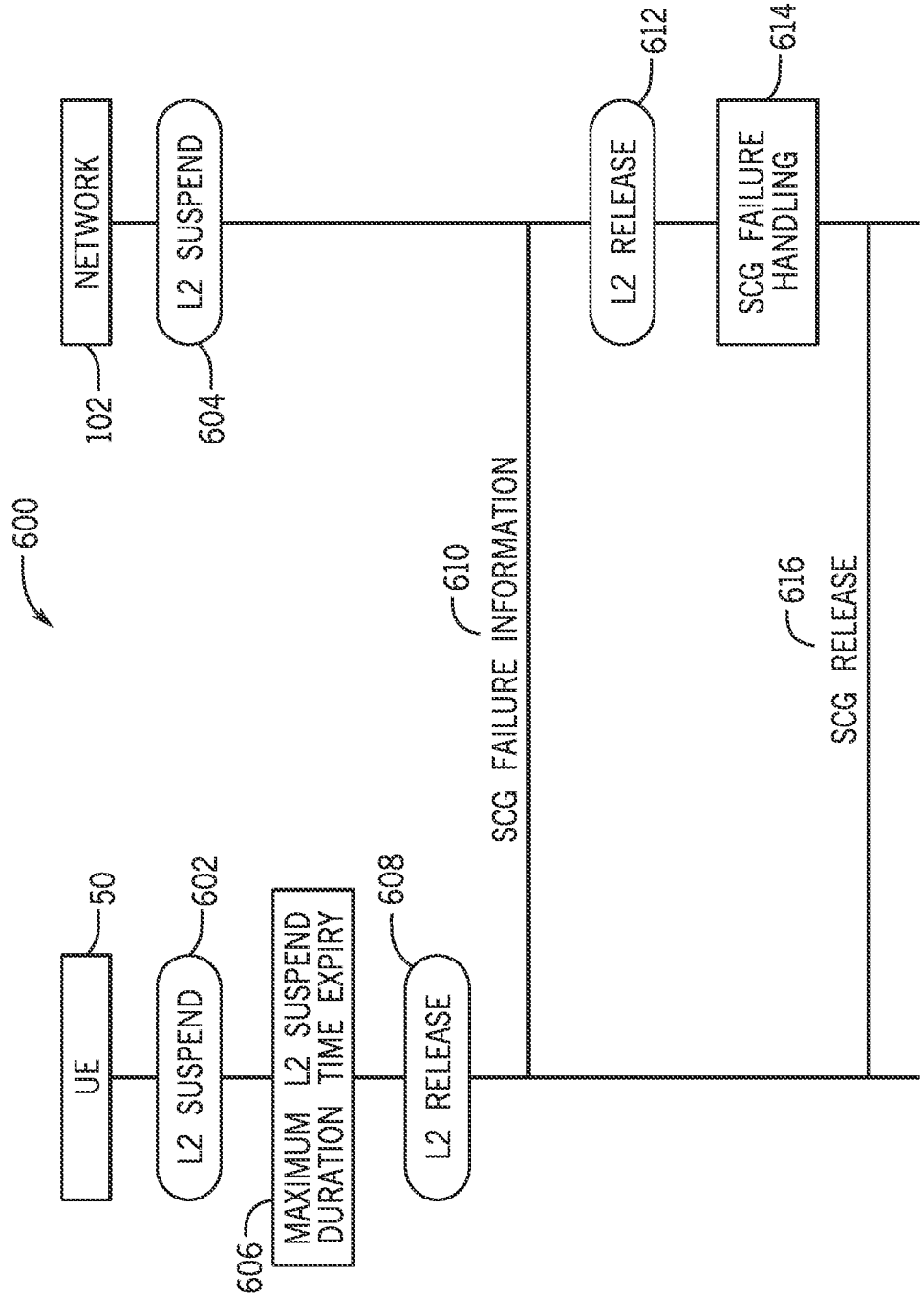
FIG. 12 is a flowchart of a method for transitioning from the suspend state to a release state of the state machine of FIG. 7, according to an embodiment of the present disclosure.

FIG. 12 is a flowchart of a method 600 for transitioning the user equipment 50 from the suspend state 354 to the release state 356 of the state machine 350 of FIG. 7. Any suitable device (e.g., a controller) that may control components of the user equipment 50, the LTE base station 104, and the 5G base station 106, such as the processor 12 of each of these devices or systems, may perform the method 450. In some embodiments, the method 600 may be implemented by executing instructions stored in a tangible, non-transitory, computer-readable medium, such as the memory 14 or storage 16, using the processor 12. For example, the method 600 may be performed at least in part by one or more software components, such as an operating system, one or more software applications, and the like, of the user equipment 50, the LTE base station 104, and the 5G base station 106. While the method 600 is described using steps in a specific sequence, it should be understood that the present disclosure contemplates that the described steps may be performed in different sequences than the sequence illustrated, and certain described steps may be skipped or not performed altogether.

The user equipment 50 may transition from the suspend state 354 to the release state 356 under at least two sets of circumstances. In the first case, when the user equipment 50 enters into the suspend state 354, the user equipment 50 monitors a duration of time that it has operated in the suspend state 354 and compares that duration against a suspend state time threshold. In the second case, when the user equipment 50 is operating in the suspend state 354 and the user equipment 50 detects that the 5G signal 122 characteristic has dropped below the second threshold, the user equipment 50 may request from the network 102 a release from the connection. That is, in process block 602, the user equipment 50 operates in the suspend state 354. As such, in process block 604, the network 102 acknowledges or is aware that the user equipment 50 is operating in the suspend state 354. In process block 606, the user equipment 50 detects that the time spent in the suspend state 354 exceeds the suspend state time threshold. As a result, in process block 608, the user equipment 50 enters the release state 356, and transmits to the network 102 the SCG failure information, as seen in action 610. If, however, the user equipment 50 determines that the time spent in the suspend state 354 does not exceed the suspend state time threshold, the user equipment may remain in the suspend state 354. It should be noted that, as previously discussed, the user equipment 50 may also transition to the release state 356 from the suspend state 354 due to the signal quality decreasing below the second threshold. In process block 612, the network 102 grants the release of the 5G link to the user equipment 50. In process block 614, the network 102 acknowledges the SCG failure handling, and, in action 616, terminates the connection with the user equipment 50 via the 5G base station 106.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. An electronic device, comprising:
   a first transceiver coupled to a first set of antennas, the first transceiver being configured to communicate with a network over a first frequency range via the first set of antennas;
   a second transceiver coupled to a second set of antennas, the second transceiver being configured to communicate with the network over a second frequency range via the second set of antennas;
   at least one processor communicatively coupled to the first transceiver and the second transceiver, the at least one processor configured to:
   cause the first transceiver to communicate with the network over the first frequency range;
   cause the second transceiver to communicate with the network over the second frequency range;
   evaluate a signal characteristic of a signal received via the second transceiver;
   cause the first transceiver or the second transceiver to send a first indication to the network that the second transceiver is entering a suspend state, and cause the second transceiver to enter the suspend state, when the signal characteristic is below a first threshold and greater than or equal to a second threshold; and
   cause the first transceiver or the second transceiver to send a second indication to the network that the second transceiver is entering a release state, and cause the second transceiver to enter the release state, when the signal characteristic is below the second threshold.

2. The electronic device of claim 1, wherein the signal characteristic comprises a signal quality.

3. The electronic device of claim 1, wherein the signal characteristic comprises a signal power.

4. The electronic device of claim 1, wherein the at least one processor is configured to stop receiving data from the network via the second transceiver based on the first indication.

5. The electronic device of claim 4, wherein the at least one processor is configured to cause the second transceiver to monitor the signal characteristic to determine if the signal characteristic increases above the first threshold after entering the suspend state.

6. The electronic device of claim 5, wherein the at least one processor is configured to cause the first transceiver or the second transceiver to send a third indication to the network that the second transceiver is entering an active state, and cause the second transceiver to enter the active state, when the signal characteristic is above the first threshold.

7. The electronic device of claim 6, wherein the at least one processor is configured to receive data from the network via the second transceiver based on the third indication.

8. The electronic device of claim 1, wherein the second transceiver is configured to terminate communication with the network based on receiving the second indication.

9. The electronic device of claim 1, wherein the at least one processor is configured to cause the second transceiver to stop monitoring the signal characteristic of the signal based on entering the release state.

10. The electronic device of claim 1, wherein the first frequency range comprises frequencies between 600 megahertz (MHz) and 5000 MHz.

11. The electronic device of claim 1, wherein the second frequency range comprises frequencies between 24.250 gigahertz (GHz) and 100 GHz.

12. A method, comprising:
communicating, via a first transceiver of an electronic device, with a network via a first frequency channel;
communicating, via a second transceiver of the electronic device, with the network via a second frequency channel; and
sending, via the first transceiver or the second transceiver, an indication to suspend data scheduling over the first frequency channel based on a signal characteristic of a signal received via the first frequency channel being below a first threshold and greater than or equal to a second threshold.

13. The method of claim 12, comprising increasing, via processing circuitry of the electronic device, an amount of data scheduled over the second frequency channel based on the signal characteristic being below the second threshold.

14. The method of claim 12, wherein the signal characteristic is associated with an uplink block error rate.

15. The method of claim 12, wherein the signal characteristic is associated with a downlink block error rate.

16. The method of claim 12, comprising sending, via the second transceiver, a second indication to release the first frequency channel based on the signal characteristic being below the second threshold.

17. One or more tangible, non-transitory, computer-readable media, comprising computer-readable instructions that, upon execution by one or more processors of an electronic device, cause the one or more processors to:
communicate, via a first transceiver of the electronic device, with a network via a first frequency channel;
communicate, via a second transceiver of the electronic device, with the network via a second frequency channel;
send, via the second transceiver, an indication to release the first frequency channel based on a signal characteristic of a signal received via the first frequency channel being below a threshold;
after sending the indication, activate the second transceiver based on the signal characteristic being above the threshold; and
send, via the first transceiver or the second transceiver, a second indication that the second transceiver is activated.

18. The one or more tangible, non-transitory, computer-readable media of claim 17, wherein the computer-readable instructions cause the one or more processors to stop monitoring, via the first transceiver, the signal characteristic after sending the second indication.

19. The one or more tangible, non-transitory, computer-readable media of claim 17, wherein the computer-readable instructions cause the one or more processors to send, via the first transceiver or the second transceiver, a first indication to suspend data scheduling over the first frequency channel based on the signal characteristic being below a second threshold and greater than or equal to the threshold.

20. The one or more tangible, non-transitory, computer-readable media of claim 17, wherein the signal characteristic is associated with an uplink block error rate, a downlink block error rate, or both.

* * * * *